United States Patent
Yoo et al.

(10) Patent No.: US 7,428,032 B2
(45) Date of Patent: Sep. 23, 2008

(54) HORIZONTAL ELECTRIC FIELD LCD TFT SUBSTRATE HAVING GATE INSULATING LAYER OF VARYING THICKNESS AND FABRICATING METHOD THEREOF

(75) Inventors: Soon-Sung Yoo, Gyeonggi-do (KR); Heung-Lyul Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 392 days.

(21) Appl. No.: 10/978,523

(22) Filed: Nov. 2, 2004

(65) Prior Publication Data

US 2005/0094079 A1 May 5, 2005

(30) Foreign Application Priority Data

Nov. 4, 2003 (KR) .................... 10-2003-0077665

(51) Int. Cl.
*G02F 1/1333* (2006.01)

(52) U.S. Cl. .................... 349/138; 349/122; 349/141; 349/187

(58) Field of Classification Search ............... 349/141, 349/122, 138, 187
See application file for complete search history.

(56) References Cited

U.S. PATENT DOCUMENTS

| | | | |
|---|---|---|---|
| 6,721,026 B2 * | 4/2004 | Cheng et al. ............... | 349/141 |
| 6,999,136 B2 * | 2/2006 | Lee ........................... | 349/43 |
| 2001/0010567 A1 * | 8/2001 | Rho et al. ................... | 349/43 |
| 2005/0110931 A1 * | 5/2005 | Yoo et al. ................... | 349/141 |

FOREIGN PATENT DOCUMENTS

| | | |
|---|---|---|
| KR | 2000-033515 | 6/2000 |
| KR | 2002-091705 | 12/2002 |
| KR | 2003-082647 | 10/2003 |

* cited by examiner

*Primary Examiner*—Andrew Schechter
(74) *Attorney, Agent, or Firm*—Morgan, Lewis & Bockius LLP

(57) ABSTRACT

A thin film transistor substrate structure of the present invention comprises a gate and a common lines formed from a first conductive layer; a data line formed from a second conductive layer and intersecting the gate and common lines, the data line insulated from the gate and common lines by a gate insulating film, a pixel area being defined by the intersection of the data and gate lines; a thin film transistor at the intersection; an extended portion of a common electrode in the pixel area; a pixel electrode formed from a third conductive layer connected to the thin film transistor and having an extended portion in the pixel area, a horizontal electric field formed by the pixel and common electrodes; and a plurality of pixel holes are defined, wherein the pixel electrode is disposed within at least one pixel hole and connected to a drain electrode.

30 Claims, 23 Drawing Sheets

HORIZONTAL ELECTRIC FIELD LCD TFT SUBSTRATE HAVING GATE INSULATING LAYER OF VARYING THICKNESS AND FABRICATING METHOD THEREOF

This application claims the benefit of Korean Patent Application No. 2003-0077665 filed on Nov. 4, 2003, which is hereby incorporated by reference.

BACKGROUND OF THE INVENTION

1. Field of the Invention

The present invention relates to a LCD device using a horizontal electric field, and more particularly to a thin film transistor substrate using a horizontal electric field type Liquid Crystal Display (LCD) device and a fabricating method thereof that are capable of simplifying a fabricating process.

2. Description of the Related Art

Generally, LCD device (LCD) devices control light transmittance of liquid crystal using an electric field to display a picture. The LCD devices are largely classified into a vertical electric field type LCD device and a horizontal electric field type LCD device depending on the direction that an electric field drives the liquid crystal material.

The vertical electric field type LCD device device drives the liquid crystal material in a twisted nematic (TN) mode with a vertical electric field formed between a pixel electrode and a common electrode arranged opposite to each other on the upper and lower substrates. The vertical electric field type LCD device has an advantage of a large aperture ratio while having a drawback of a narrow viewing angle about 90°.

The horizontal electric field type LCD device device drives liquid crystal material in an in plane switch (IPS) mode with a horizontal electric field formed between the pixel electrode and the common electrode arranged parallel to each other on the lower substrate. The horizontal electric field type LCD device has an advantage of an wide viewing angle about 160°.

Hereinafter, horizontal electric field type LCD device will be described in detail. The horizontal electric field applying type LCD device includes a thin film transistor substrate (i.e., a lower substrate) and a color filter substrate (i.e., an upper substrate) joined with each other, a spacer for uniformly maintaining a cell gap between two substrates, and a liquid crystal material interposed in the cell gap. The thin film transistor substrate includes a plurality of signal wirings for forming a horizontal electric field for each pixel, a plurality of thin film transistors, and an alignment film coated thereon to align the liquid crystal material. The color filter substrate includes a color filter for implementing a color, a black matrix for preventing a light leakage and an alignment film coated thereon for aligning the liquid crystal material.

In such a LCD device, the thin film transistor substrate has a complicated fabrication process that leads to a significant increase in manufacturing cost, because the fabrication process involves a semiconductor process which includes a plurality of mask processes. To solve this problem, the thin film transistor substrate manufacturing process has been developed to reduce the number of mask processes, for example one mask process can accommodate several processes such as thin film deposition, cleaning, photolithography, etching, photo-resist stripping and inspection processes, or other suitable process. Recently, a four mask process, one less mask process than the current mask process, is becoming a standard mask process of the thin film transistor.

FIG. 1 is a plan view showing a structure of a thin film transistor substrate of horizontal electric type LCD device adopting the related art four-mask process, and FIG. 2 is a cross-sectional view of the thin film transistor substrate taken along lines I-I' and II-II' of FIG. 1. Referring to FIG. 1 and FIG. 2, the thin film transistor substrate includes a gate line 2 and a data line 4 provided on a lower substrate 45 intersecting each other and insulated from each other by a gate insulating film 46 therebetween, a thin film transistor 6 provided at an intersection of the gate line 2 and the date line 4, a pixel electrode 14 and a common electrode 18 provided at a pixel area defined by the intersection structure for forming a horizontal field, and a common line 16 connected to the common electrode 18. Furthermore, the thin film transistor substrate includes a storage capacitor 20 provided at an area where the pixel electrode 14 overlaps the common line 16, a gate pad 24 connected to the gate line 2, and a data pad 30 connected to the data line 4 and a common pad 36 connected to the common line 16. The gate line 2 is supplied with a gate signal and the data line 4 is supplied with a data signal and are provided in an intersection structure to defined a pixel area. The common line 16 is provided in parallel with the gate line 2 having the pixel area therebetween. In addition, the common line 16 is supplied with a reference voltage for driving the liquid crystal material.

The thin film transistor 6 includes a gate electrode 8 connected to the gate line 2, a source electrode 10 connected to the data line 4, and a drain electrode 12 connected to the pixel electrode 14. Furthermore, the thin film transistor 6 includes an active layer 48 overlapping the gate electrode 8 and having a gate insulating film 46 therebetween to define a channel between the source electrode 10 and the drain electrode 12. The thin film transistor 6 allows the pixel signal from the data line 4 to be charged and maintained in the pixel electrode 14 in response to the gate signal from the gate line 2.

The active layer 48 also overlaps the data line 4, a lower data pad electrode 32 and an upper storage electrode 22. An ohmic layer 50 is provided on the active layer 48 to make an ohmic contact with the data line 4, the source electrode 10, the drain electrode 12, the lower data pad electrode 32. The pixel electrode 14 is connected to the drain electrode 12 of the thin film transistor 6 via a first contact hole 13 defined by passing through a protective film 52 provided at the pixel area 5. Further, the pixel electrode 14 includes a first horizontal part 14A connected to the drain electrode 12 and provided parallel with adjacent gate lines 2, a second horizontal part 14B overlapping the common line 16, and an extended portion 14C provided between the first and second horizontal parts 14A and 14B. The common electrode 18 is connected to the common line 16 and is provided at the pixel area 5. Specifically, the common electrode 18 is provided parallel with the extended portion 14C of the pixel electrode 14 at the pixel area 5.

Accordingly, a horizontal electric field is formed between the pixel electrode 14 to which a pixel signal is supplied via the thin film transistor 6 and the common electrode 18 to which a reference voltage is supplied via the common line 16. Particularly, the horizontal electric field is formed between the extended portion 14C of the pixel electrode 14 and the extended portion of common electrode 18. A liquid crystal material arranged in the horizontal direction by the horizontal electric field between the thin film transistor substrate and the color filter substrate by such a horizontal electric field are rotated due to dielectric anisotropy. Transmittance of light to the pixel area 5 is varied depending on a rotation extent of the liquid crystal material, thereby implementing a gray level scale.

The storage capacitor 20 includes the common line 16, an upper storage electrode 22 overlapping the common line 16. The gate insulating film 46, the active layer 48 and the ohmic contact layer 50 are disposed between the common line 16 and the upper storage electrode 22, thereby insulating each other. A pixel electrode 14 connected to the upper storage electrode 22 via a second contact hole 21 provided at the protective film 52. The storage capacitor 20 allows a pixel signal charged in the pixel electrode 14 to be maintained until the next pixel signal is charged.

The gate line 2 is connected to a gate driver (not shown) via the gate pad 24. The gate pad 24 comprises a lower gate pad electrode 26 extended from the gate line 2, and an upper gate pad electrode 28 connected to the lower gate pad electrode 26 via a third contact hole 27 defined by passing through the gate insulating film 46 and the protective film 52. The data line 4 is connected to the data driver (not shown) via the data pad 30. The data pad 30 includes a lower data pad electrode 32 extended from the data line 4, and an upper data pad electrode 34 connected to the lower data pad electrode 32 via a fourth contact hole 33 defined by passing through the protective film 52. The common line 16 receives a reference voltage from an external reference voltage source (not shown) through the common pad 36. The common pad 36 comprises a lower common pad electrode 38 extended from the common line 16, and an upper common pad electrode 40 connected to the lower common pad electrode 38 via a fifth contact hole 39 defined by passing through the gate insulating film 46 and the protective film 52.

A method of fabricating the thin film transistor substrate having the above-mentioned structure using the four-round mask process will be described in detail with reference to FIGS. 3A to 3D.

Referring to FIG. 3A, a gate metal pattern group including the gate line 2, the gate electrode 8, the lower gate pad electrode 26, the common line 16, the common electrode 18, and the lower common pad electrode 38 are provided on the lower substrate 45 by the first mask process. More specifically, a gate metal layer is formed on the upper substrate 45 by a deposition technique such as sputtering. Then, the gate metal layer is patterned by the photolithography and etching process using a first mask to form the gate metal pattern group. The gate metal layer is formed from a metal in an aluminum-group metal, such as chrome (Cr) or molybdenum (Mo).

Referring to FIG. 3B, the gate insulating film 46 is coated onto the lower substrate 45 provided with the gate metal pattern group. Then, a semiconductor pattern including the active layer 48 and the ohmic contact layer 50 are disposed followed by a source/drain metal pattern group including the data line 4, the source electrode 10, the drain electrode 12, the lower data pad electrode 32, and the upper storage electrode 22, by the second mask process.

More specifically, the gate insulating film 46, an amorphous silicon layer (i.e., active layer 48), an n$^+$ amorphous silicon layer (i.e., ohmic contact layer 50) and a source/drain metal layer are sequentially disposed on the lower substrate 45 which is provided with the gate metal pattern group by deposition techniques such as plasma enhanced chemical vapor deposition (PECVD) and sputtering, or other suitable technique. The gate insulating film 46 is formed of an inorganic insulating material such as silicon nitride ($SiN_x$) or silicon oxide ($SiO_x$). The source/drain metal is formed of molybdenum (Mo), titanium (Ti), tantalum (Ta) or a molybdenum alloy, or other suitable material.

Then, a photo-resist pattern is formed on the source/drain metal layer by photolithography using a second mask. In this case, a diffractive exposure mask having a diffractive exposing part at a channel portion of the thin film transistor is used as a second mask, thereby allowing a photo-resist pattern of the channel portion to have a lower height than other source/drain pattern portion. Subsequently, the source/drain metal layer is patterned by a wet etching process using the photo-resist pattern to provide the source/drain metal pattern group.

Next, the n$^+$ amorphous silicon layer (i.e., ohmic contact layer 50) and the amorphous silicon layer (i.e., active layer 48) are patterned simultaneously by a dry etching process using the same photo-resist pattern to provide the ohmic contact layer 50 and the active layer 48. The photo-resist pattern having a relatively low height is removed from the channel portion by the ashing process and thereafter the source/drain metal pattern and the ohmic contact layer 50 of the channel portion are etched by the dry etching process. Thus, the active layer 48 of the channel portion is exposed to disconnect the source electrode 10 from the drain electrode 12. Then, the photo-resist pattern left on the source/drain metal pattern group is removed by a stripping process.

Referring to FIG. 3C, the protective film 52 including first to fifth contact holes 13, 21, 27, 33 and 39 are formed on the gate insulating film 46 provided with the source/drain metal pattern group by the third mask process.

More specifically, the protective film 52 provided on the gate insulating film 46 is patterned by the photolithography and the etching process using the third mask to define the first to fifth contact holes 13, 21, 27, 33 and 39. The first contact hole 13 passes through the protective film 52 to expose the drain electrode 12, whereas the second contact hole 21 passes through the protective film 52 to expose the upper storage electrode 22. The third contact hole 27 passes through the protective film 52 and the gate insulating film 46 to expose the lower gate pad electrode 26. The fourth contact hole 32 passes through the protective film 52 to expose the lower data pad electrode 32. The fifth contact hole 30 passes through the protective film 52 and the gate insulating film 48 to expose the lower common pad electrode 38. If the source/drain metal is formed of a metal having a large dry-etching ratio such as molybdenum (Mo), then each of the first, second and fourth contact holes 13, 21 and 33 passes through the drain electrode 12, the upper storage electrode 22 and the lower data pad electrode 32 to expose the side portion of the source/drain metal pattern group. The protective film 50 is formed of an inorganic material identical to that of the gate insulating film 46, or an organic material having a low dielectric constant such as an acrylic organic compound, BCB (benzocyclobutene) or PFCB (perfluorocyclobutane), or other suitable material.

Referring to FIG. 3D, the transparent conductive film pattern group including the pixel electrode 14, the upper gate pad electrode 28, the upper data pad electrode 34 and the upper common pad electrode 40 are provided on the protective film 52 by the fourth mask process. More specifically, a transparent conductive film is coated onto the protective film 52 by a deposition technique such as sputtering, or other suitable technique. Then, the transparent conductive film is patterned by photolithography and the etching process using a fourth mask to provide the transparent conductive pattern group. The pixel electrode 14 is electrically connected to the drain electrode 12 via the first contact hole 13 and also is electrically connected to the upper storage electrode 22 via the second contact hole 21. The upper gate pad electrode 28 is electrically connected to the lower gate pad electrode 26 via the third contact hole 37. The upper data pad electrode 34 is electrically connected to the lower data pad electrode 32 via the fourth contact hole 33. The upper common pad electrode 40 is electrically connected to the lower common pad electrode 38 via the fifth contact hole 39. The transparent conductive film is formed of indium-tin-oxide (ITO), tin-oxide (TO) or indium-zinc-oxide (IZO), or other suitable material.

The related art thin film transistor substrate of horizontal electric field type LCD device and the fabricating method thereof as mentioned above adopts the four-round mask process, thereby reducing the number of fabricating processes and hence reducing a manufacturing cost compared with those using the five-round mask process. However, since the four-round mask process still has a complicated fabricating process to limit a further cost reduction, there has been required a scheme capable of simplifying the fabricating process even further to save the manufacturing cost.

SUMMARY OF THE INVENTION

Accordingly, the present invention is directed to a thin film transistor substrate using a horizontal electric field type LCD device and a fabricating method thereof that substantially obviates one or more of the problems due to limitations and disadvantages of the related art.

An object of the present invention is to provide a three-round mask process including a lift-off process enhanced by at least one stripper penetration path that significantly simplifies the mask process, reduces the manufacturing cost, and achieves the higher production yield.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance of the invention, a thin film transistor substrate structure using a horizontal electric field type LCD device comprises a gate line and a common line disposed on a substrate and arranged parallel with each other, wherein the gate line and the common line are formed from a first conductive layer; a data line on the substrate and intersecting the gate line and the common line, the data line insulated from the gate line and the common line by a gate insulating film therebetween, a pixel area being defined by the intersection of the data line with the gate line, wherein the data line is formed from a second conductive layer; a thin film transistor at the intersection of the data line and the gate line, and connected to the gate line and the data line; a common electrode having a portion extended from the common line into the pixel area and formed from the first conductive layer; a gate insulating film disposed between the first conductive layer and the second conductive layer, the gate insulating film at the pixel having relatively thin thickness than the other area; a protective film over the gate line, the common line, the data line, the common electrode, and the thin film transistor; and a pixel hole defined through the protective film and the gate insulating film and formed parallel with the common electrode; a pixel electrode having a portion extended into the pixel area and connected to the thin film transistor, wherein the pixel electrode is formed from a third conductive layer and forming a horizontal electric field with the common electrode, wherein the pixel electrode is disposed within the pixel hole.

In another aspect, a method of fabricating a thin film transistor substrate structure using a horizontal electric field type liquid crystal display device comprises the steps of forming a gate line, a gate electrode is connected to the gate line, a common line being parallel to the gate line, a common electrode extended from the common line into a pixel area from a first conductive layer on a substrate; providing a gate insulating film on the substrate disposed with the gate line, the common line, and the common electrode; forming a semiconductor pattern including an active layer and an ohmic contact layer on the gate insulating film; forming a data line, a source electrode, a drain electrode from a second conductive layer on the semiconductor pattern, wherein the data line crosses the gate line and the common line, the source electrode is connected to the data line, and the drain electrode is formed opposite to the source electrode; reducing a thickness of the gate insulating film at portions where the second conductive layer is absent; providing a protective film on the on the substrate disposed with the semiconductor pattern and the second conductive layer; and patterning the protective film and the gate insulating film disposed on the substrate to provide a pixel hole formed parallel to the common electrode, wherein portion of the drain electrode is exposed within the pixel hole; forming a pixel electrode connected to the drain electrode from a third conductive layer, the pixel electrode disposed within the hole.

In another aspect, a method of fabricating a thin film transistor substrate structure using a horizontal electric field type liquid crystal display device comprises a first mask process of forming a gate line, a gate electrode connected to the gate line, a common line being parallel to the gate line, a common electrode extended from the common line into a pixel area from a first conductive layer on a substrate; a second mask process including providing a gate insulating film on the substrate disposed with the gate line, the gate electrode, the common line, and the common electrode, forming a semiconductor pattern including an active layer and an ohmic contact layer on the gate insulating film, forming a data line, a source electrode, a drain electrode from a second conductive layer on the semiconductor pattern, reducing a thickness of the gate insulating film at portions where the second conductive layer is absent, wherein the data line crosses the gate line and the common line, the source electrode is connected to the data line, and the drain electrode is formed opposite to the source electrode; a third mask process including providing a protective film on the substrate deposed with the second conductive layer and the semiconductor pattern and patterning the protective film and the gate insulating film to provide a pixel hole formed parallel to the common electrode and forming a pixel electrode within the pixel hole from a third conductive layer, wherein the pixel electrode is connected to the portion of the drain exposed through the pixel hole.

It is to be understood that both the foregoing general description and the following detailed description are exemplary and explanatory and are intended to provide further explanation of the invention as claimed.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of the present invention will be described in detail with reference to FIGS. 4 to 10D.

Figure 1:
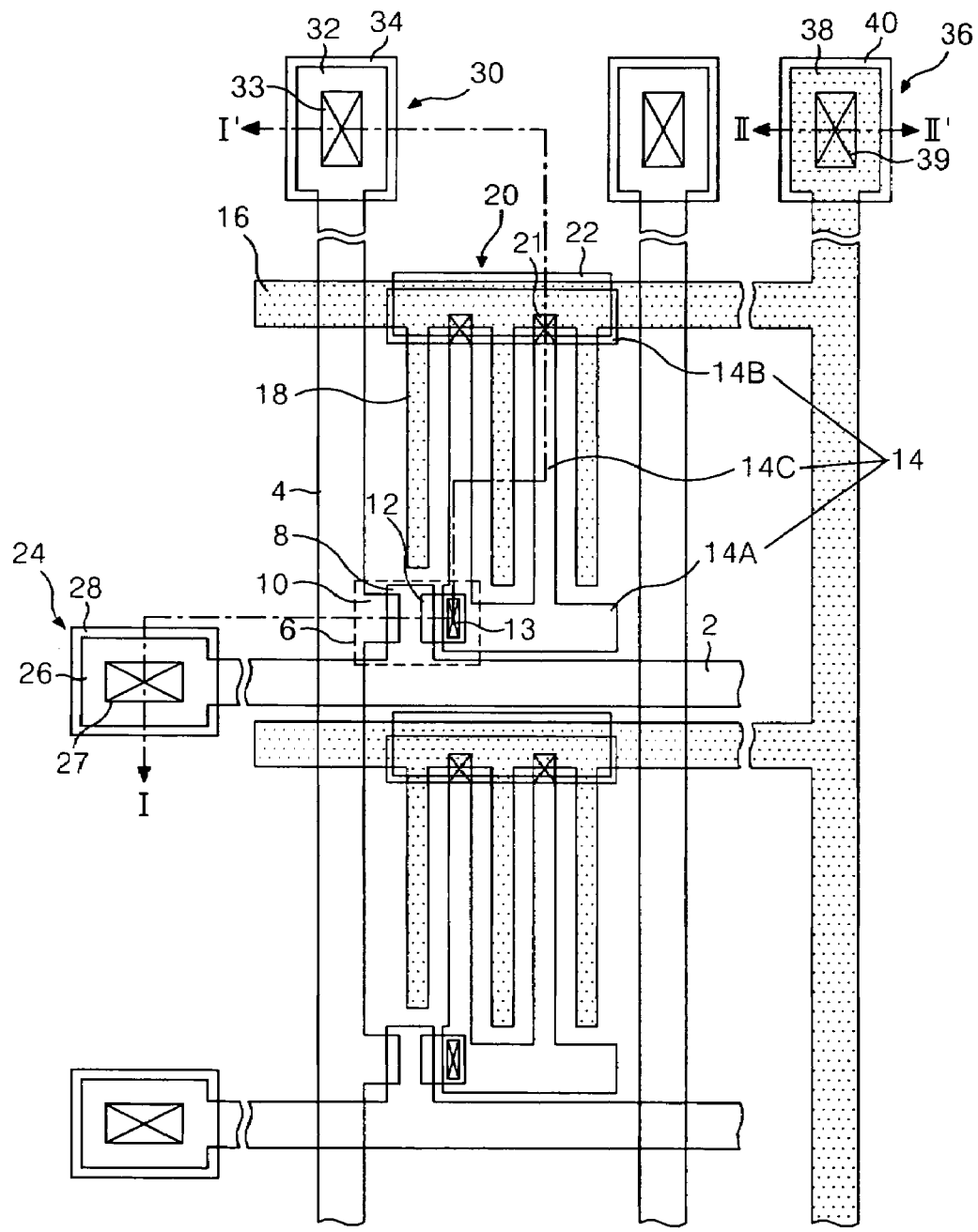
FIG. 1 is a plan view showing a structure of the related art thin film transistor substrate of horizontal electric field type LCD device.
Figure 2:
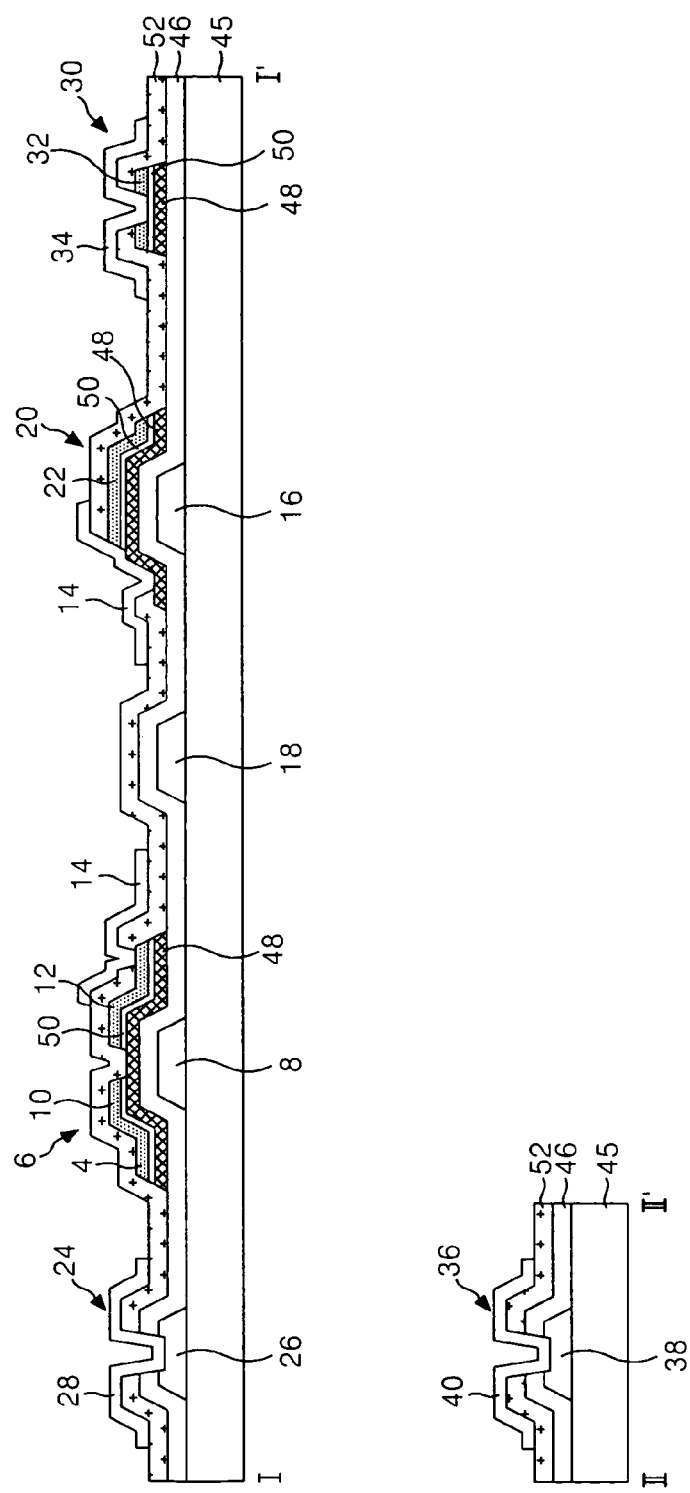
FIG. 2 is a cross-sectional view of the thin film transistor substrate taken along lines I-I' and II-II' of FIG. 1.
Figure 3A:
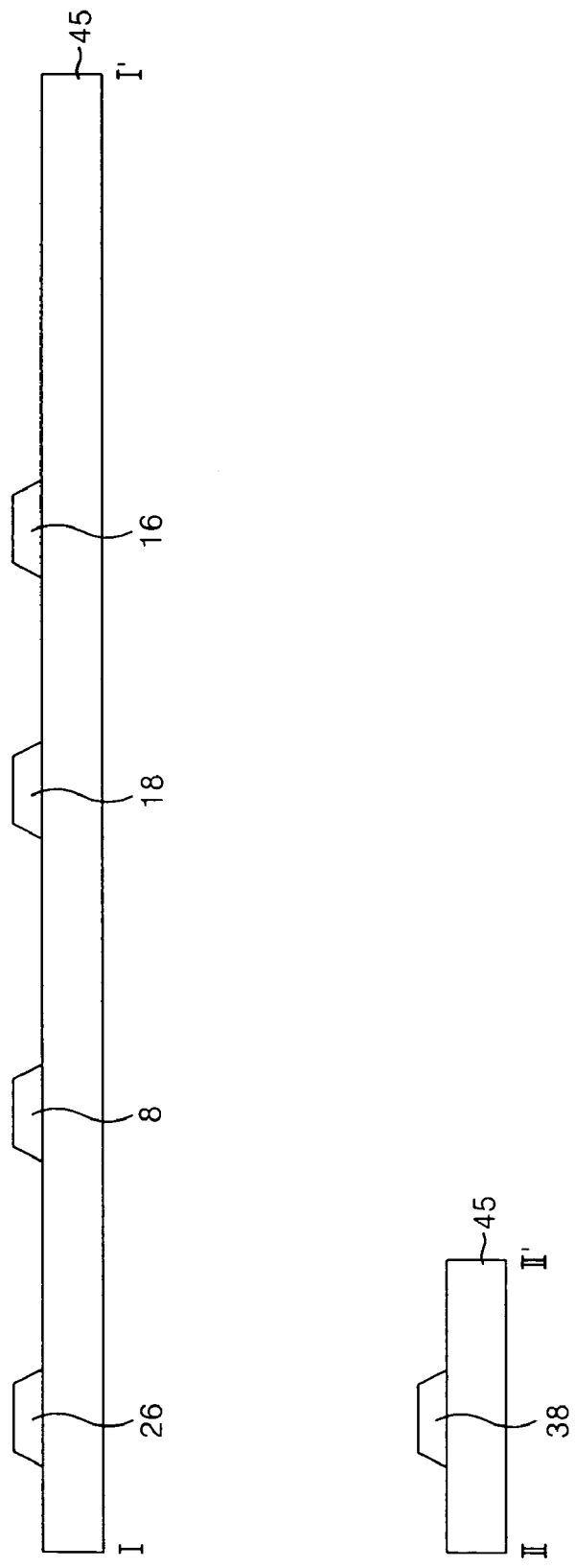
FIGS. 3A to 3D are cross-sectional views illustrating the step-by-step method of fabricating the thin film transistor substrate of FIG. 2.
Figure 3B:
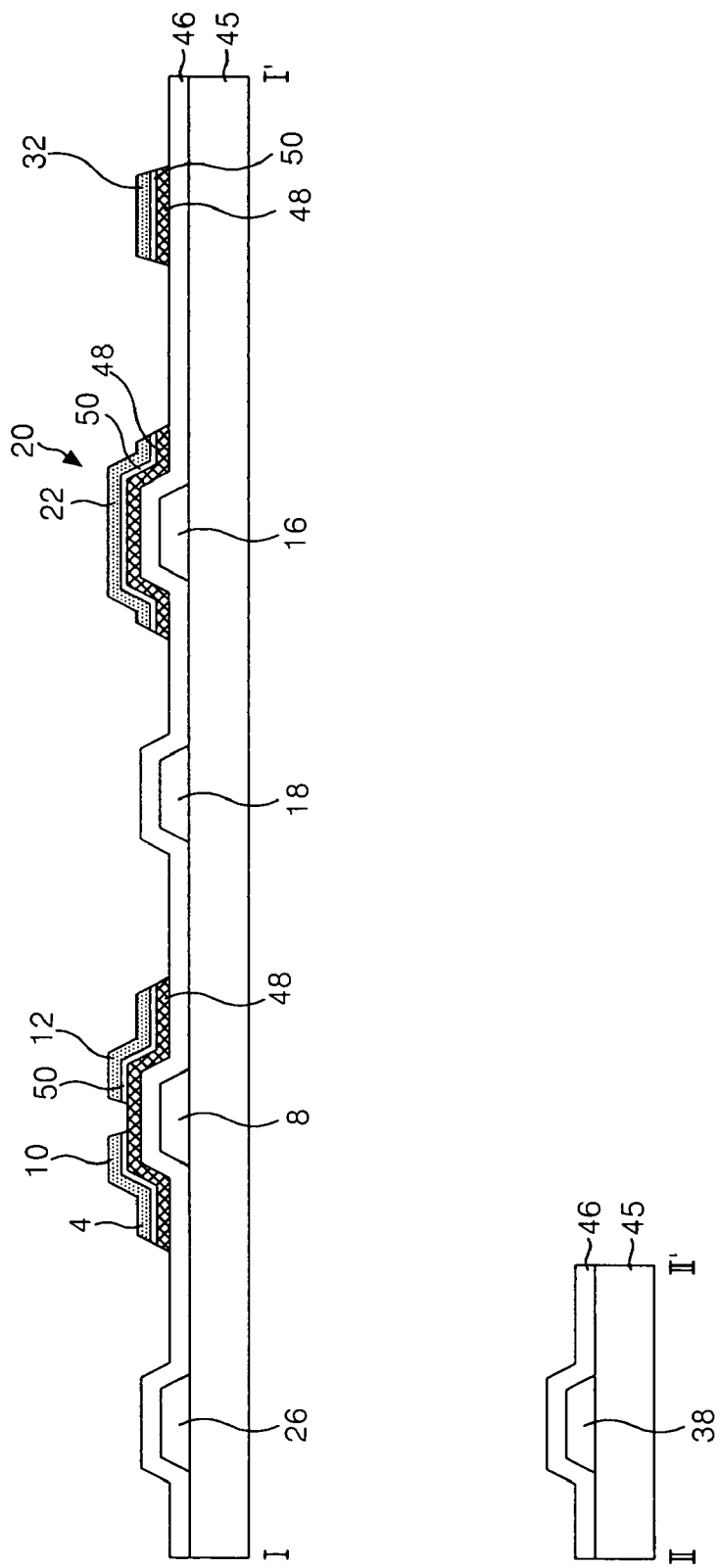
Figure 3C:
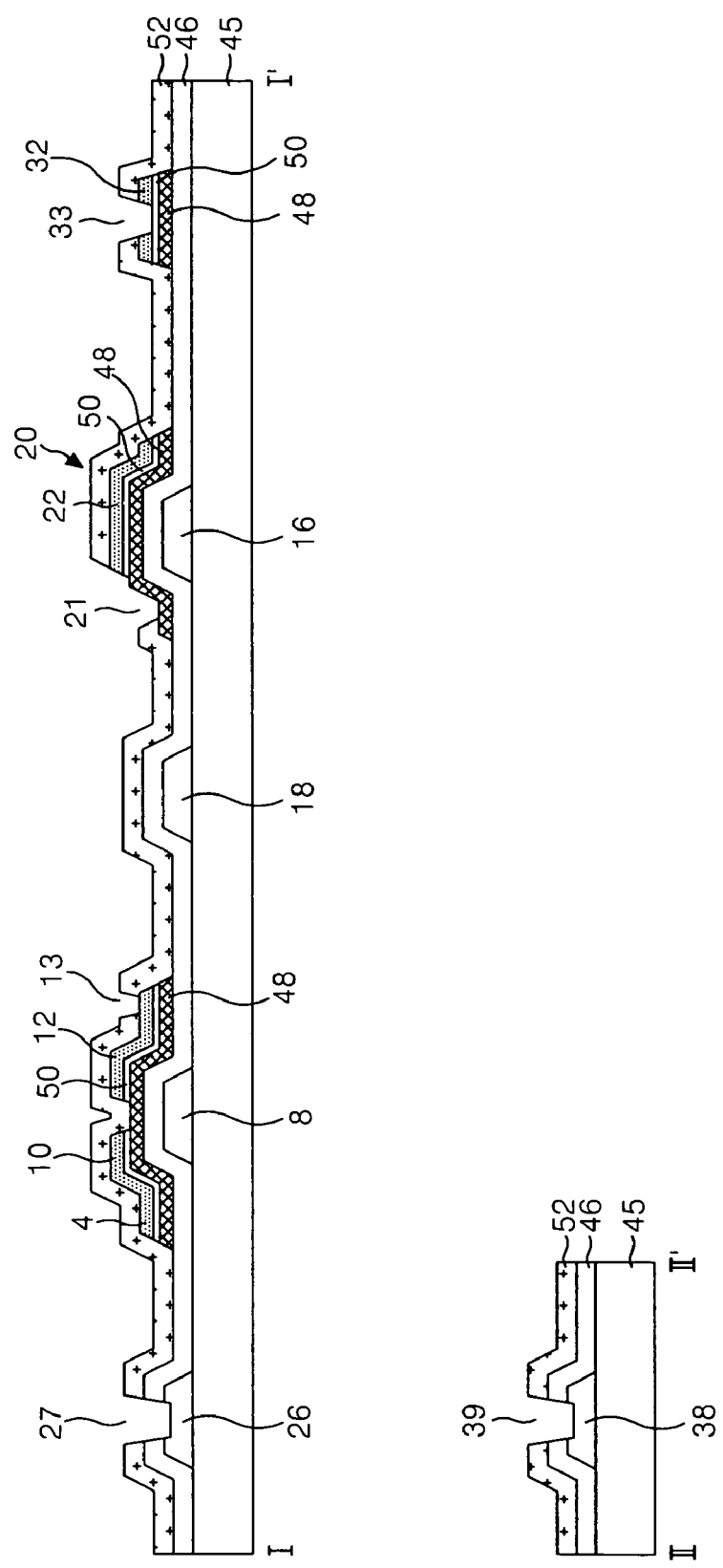
Figure 3D:
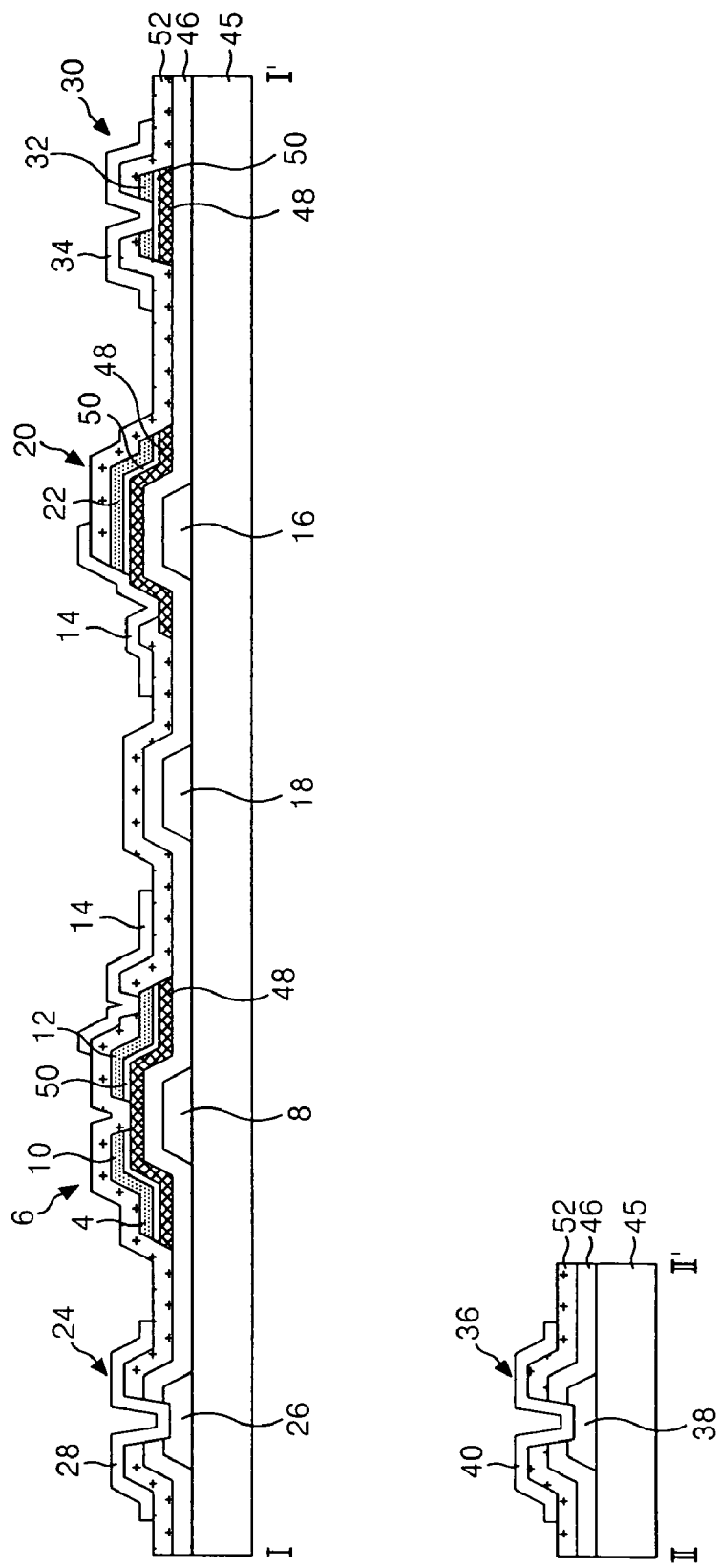
Figure 4:
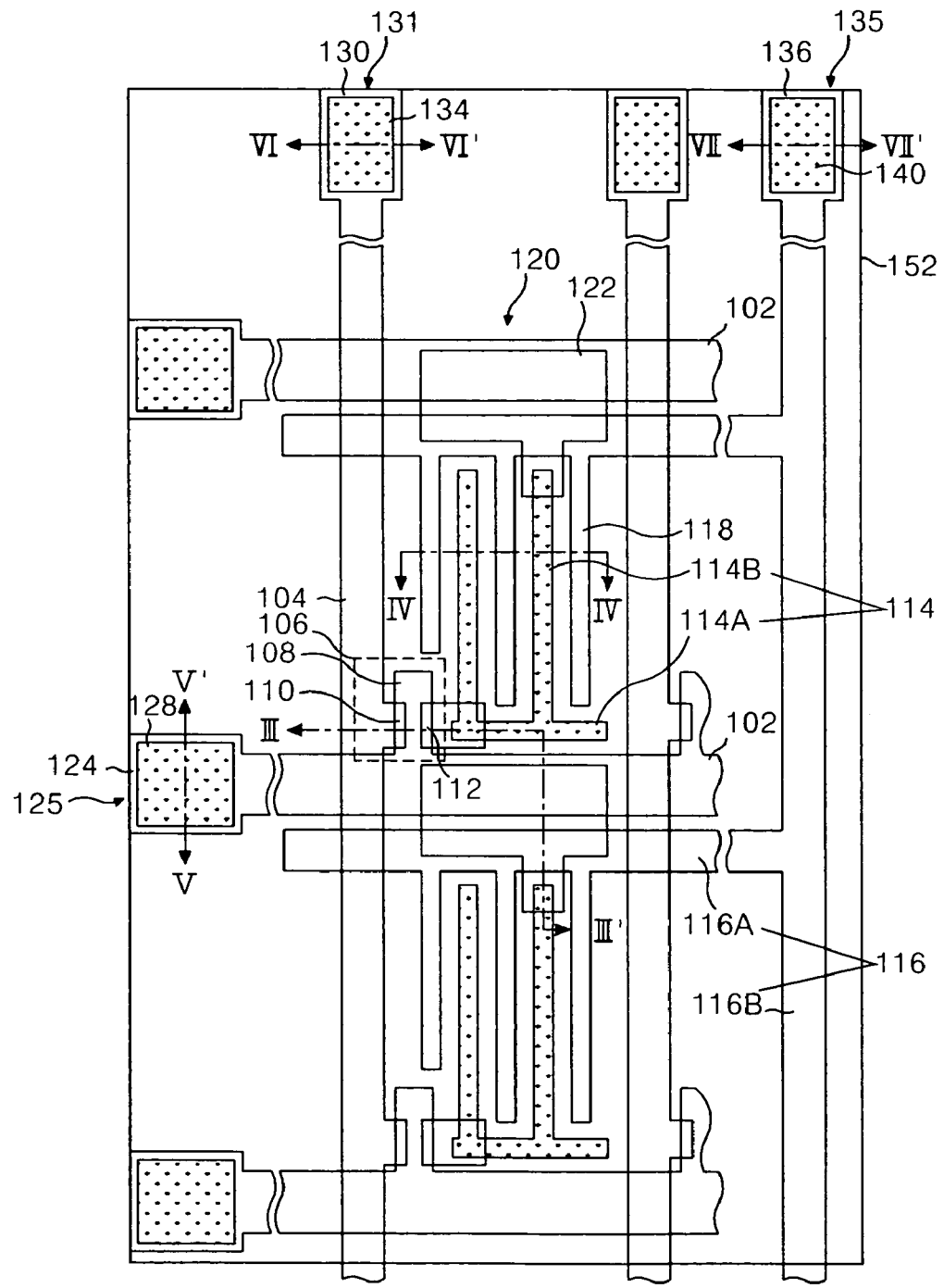
FIG. 4 is a plan view showing a structure of a thin film transistor substrate of horizontal electric field type LCD device according to an embodiment of the present invention.
Figure 5:
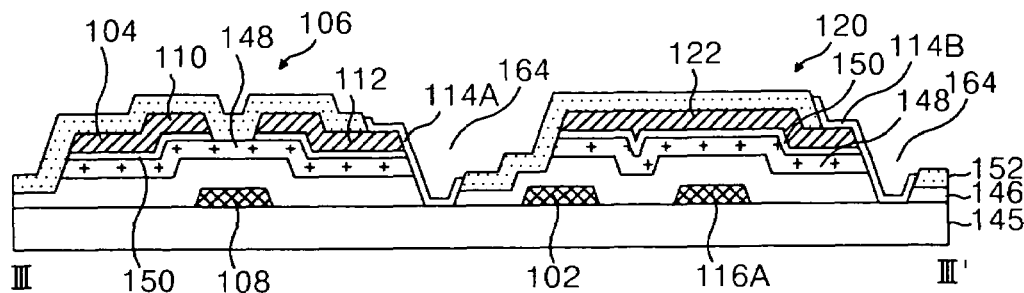
FIG. 5 is a cross-sectional view of the thin film transistor substrate taken along lines III-III', IV-IV', V-V', VI-VI' and VII-VII' of FIG. 4.
Figure 5:
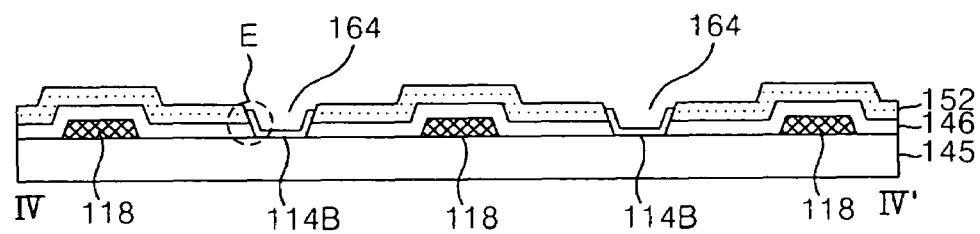
Figure 5:
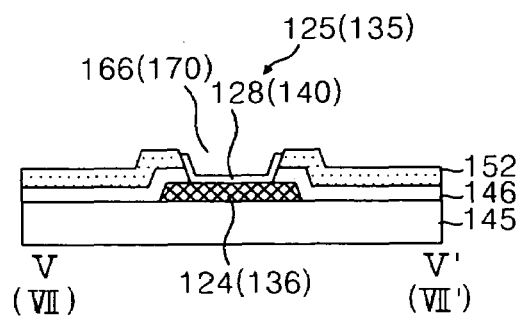
Figure 5:
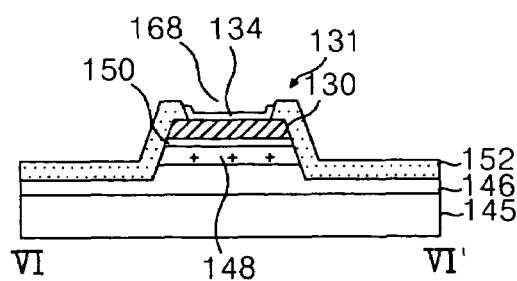

FIG. 4 is a plan view showing a structure of a thin film transistor substrate of horizontal electric field type LCD DEVICE according to an embodiment of the present invention, and FIG. 5 is a cross-sectional view of the thin film transistor substrate taken along lines III-III', IV-IV', V-V', VI-VI' and VII-VII' of FIG. 4.

Referring to FIG. 4 and FIG. 5, the thin film transistor substrate includes a gate line 102 and a data line 104 provided on a lower substrate 145 intersecting each other and having a gate insulating film 146 therebetween, a thin film transistor 106 provided at an intersection of the gate line 102 and the data line 104, a pixel electrode 114 and a common electrode 118 provided at a pixel area defined by the intersection structure for forming a horizontal electric field, and a common line 116 connected to the common electrode 118. Furthermore, the thin film transistor substrate includes an upper storage electrode 122, a common line 116, a gate pad 125 connected to the gate line 102, a data pad 131 connected to the data line 104, a common pad 135 connected to the common line 116, and a storage capacitor 120 provided overlapping a portion of the gate line 102.

The gate line 102 which is supplied with a gate signal and the data line 104 which is supplied with a data signal are provided in an intersection structure to define a pixel area. The gate line 102 is formed from a first conductive layer (i.e., a gate metal layer) while the data line 104 is formed from a second conductive layer (i.e., a source/drain metal layer).

The common line 116 and the common electrode 118 supply a reference voltage to drive the liquid crystal material. The common line 116 includes an internal common line 116A provided parallel to the gate line 102 at a display area, and an external common line 116B commonly connected to the internal common line 116A at the non-display area. The common electrode 118 has an extended portion that is extended from the internal common line 116A into the pixel area. The common line 116 and the common electrode 118 are formed from an identical first conductive layer material as that of the gate line 102.

The thin film transistor 106 allows the pixel signal from the data line 104 to be charged at the pixel electrode 114 and be maintained. The thin film transistor 106 includes a gate electrode 108 connected to the gate line 102, a source electrode 110 connected to the data line 104, a drain electrode 112 connected to pixel electrode 114, a drain electrode 112 disposed opposite to the source electrode 110, an active layer 148 overlapping the gate electrode 108 and having the gate insulating film 146 therebetween to define a channel between the source electrode 110 and the drain electrode 112, and an ohmic contact layer 150 disposed on the active layer 148 excluding the channel portion, thus forming an ohmic contact with the source electrode 110 and the drain electrode 112. Furthermore, both the active layer 148 and the ohmic contact layer 150 overlap the data line 104, a lower data pad electrode 130, and an upper storage electrode 122 that are formed from a second conductive layer along with the source electrode 110 and the drain electrode 112.

The pixel electrode 114 and the common electrode 118 form a horizontal electric field at the pixel area. The pixel electrode 114 is connected to the drain electrode 112 of the thin film transistor 106. More specifically, the pixel electrode 114 includes a horizontal part 114A disposed parallel to the gate line 102 and to be connected to the drain electrode 112, and the extended portion 114B extended from the horizontal part 114A into the pixel area to be disposed parallel to the extended portion of common electrode 118. The pixel electrode 114 is formed from a third conductive layer (i.e., a transparent conductive layer or a Ti layer) and disposed within a pixel hole 164 defined by passing through a protective film 152 and a gate insulating film 146 at the pixel area. Thus, the step coverage between the pixel electrode 114 and the common electrode 118 can be eliminated.

The horizontal part 114A of the pixel electrode 114 is connected to a portion of the drain electrode 112 exposed by the pixel hole 164. As a result, a horizontal electric field is formed between the pixel electrode 114 to which a pixel signal is supplied via the thin film transistor 106 and the common electrode 118 to which a reference voltage is supplied via the common line 116. Particularly, a horizontal electric field is formed between the extended portion 114B of the pixel electrode 114 and the extended portion of common electrode 118. A liquid crystal material arranged in the horizontal direction between the thin film transistor substrate and the color filter substrate by such a horizontal electric field are rotated due to dielectric anisotropy. Transmittance of light to the pixel area is varied depending on a rotation extent of the liquid crystal material, thereby implementing a gray level scale.

The storage capacitor includes a portion of the gate line 102 forming a first lower storage electrode, a portion of an internal common line 116A forming a second lower storage electrode, and an upper storage electrode 122 overlapping the first and second lower electrodes and having the gate insulating film 146, the active layer 148 and the ohmic contact layer 150 therebetween. The upper storage electrode 122 is formed from a second conductive layer along with the data line 104, the source electrode 110 and the drain electrode 112. Furthermore, a portion extended into the pixel electrode 114 of the upper storage electrode 122 is exposed through the pixel hole 164, thereby connecting the upper storage electrode 122 to the extended portion 114B of the pixel electrode 114. The storage capacitor allows a pixel signal charged in the pixel electrode 114 to be maintained until the next pixel signal is charged.

The gate line 102 is connected to a gate driver (not shown) via the gate pad 125. The gate pad 125 includes a lower gate pad electrode 124 extended from the gate line 102, and an upper gate pad electrode 128 connected to the lower gate pad electrode 124 via a first contact hole 166 defined by passing through the gate insulating film 146 and the protective film 152. The common line 116 receives a reference voltage from an external reference voltage source (not shown) through the common pad 135. The common pad 135 includes a lower common pad electrode 136 extended from the common line 116, and an upper common pad electrode 140 connected to the lower common pad electrode 136 via a second contact hole 170 defined by passing through the gate insulating film 146 and the protective film 152. The data line 104 is connected to the data driver (not shown) via the data pad 131. The data pad 131 includes a lower data pad electrode 130 extended from the data line 104, and an upper data pad electrode 134 connected to the lower data pad electrode 130 via a third contact hole 168 defined by passing through the protective film 152.

In such a thin film transistor transistor, the upper gate pad electrode 128, the upper data pad electrode 134 and the upper common pad electrode 140, and the pixel electrode 114 are formed from a third conductive layer. The third conductive layer is patterned by a lift-off process of removing a photo-resist pattern disposed on the protective film 152 and the gate insulating film 146. Thus, the patterned third conductive layer interfaces with the protective film 152. The thin film transistor substrate according to an embodiment of the present invention can reduce one mask process which is patterning the third conductive layer by the lift-off process. In this case, the pixel hole 164 and the first to third contact holes 166, 170 and 168 are used as a stripper penetration path to enhance a lift-off ability of the photo-resist pattern.

Furthermore, the pixel electrode 114 and the gate insulating film 146 disposed at the pixel area is relatively thinly formed such that at an edge E of FIG. 5, the pixel electrode 114 has a low step coverage. This is caused by a fact that, when the edge E of the pixel electrode 114 has a high step coverage (for example, when the pixel electrode is formed within the pixel hole which is defined by passing through the protective film and the relatively thick gate insulating film), the high step coverage may result in an alignment error leading to generation of a light leakage. According to an embodiment of the present invention, the edge E of the pixel electrode 114 has a low step coverage to prevent such a light leakage error. Meanwhile, the gate insulating film 146 disposed at thin film transistor 106, the data line 104, and the gate line 102 is relatively thickly formed to prevent an insulation breakage.

Figure 6A:
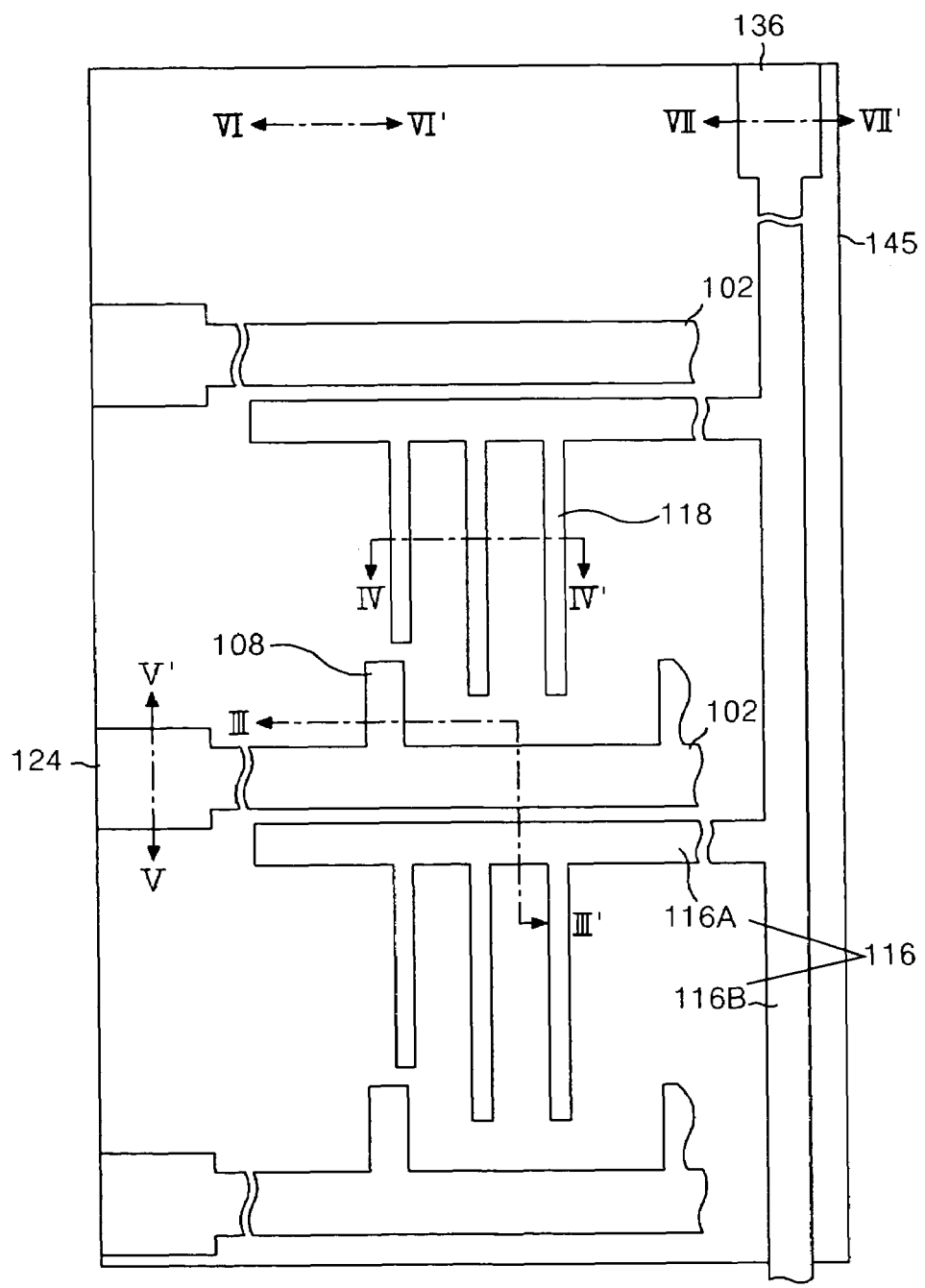
FIG. 6A and FIG. 6B are a plan view and a cross-sectional view for explaining a first mask process in a method of fabricating the thin film transistor substrate according to an embodiment of the present invention.
Figure 6B:
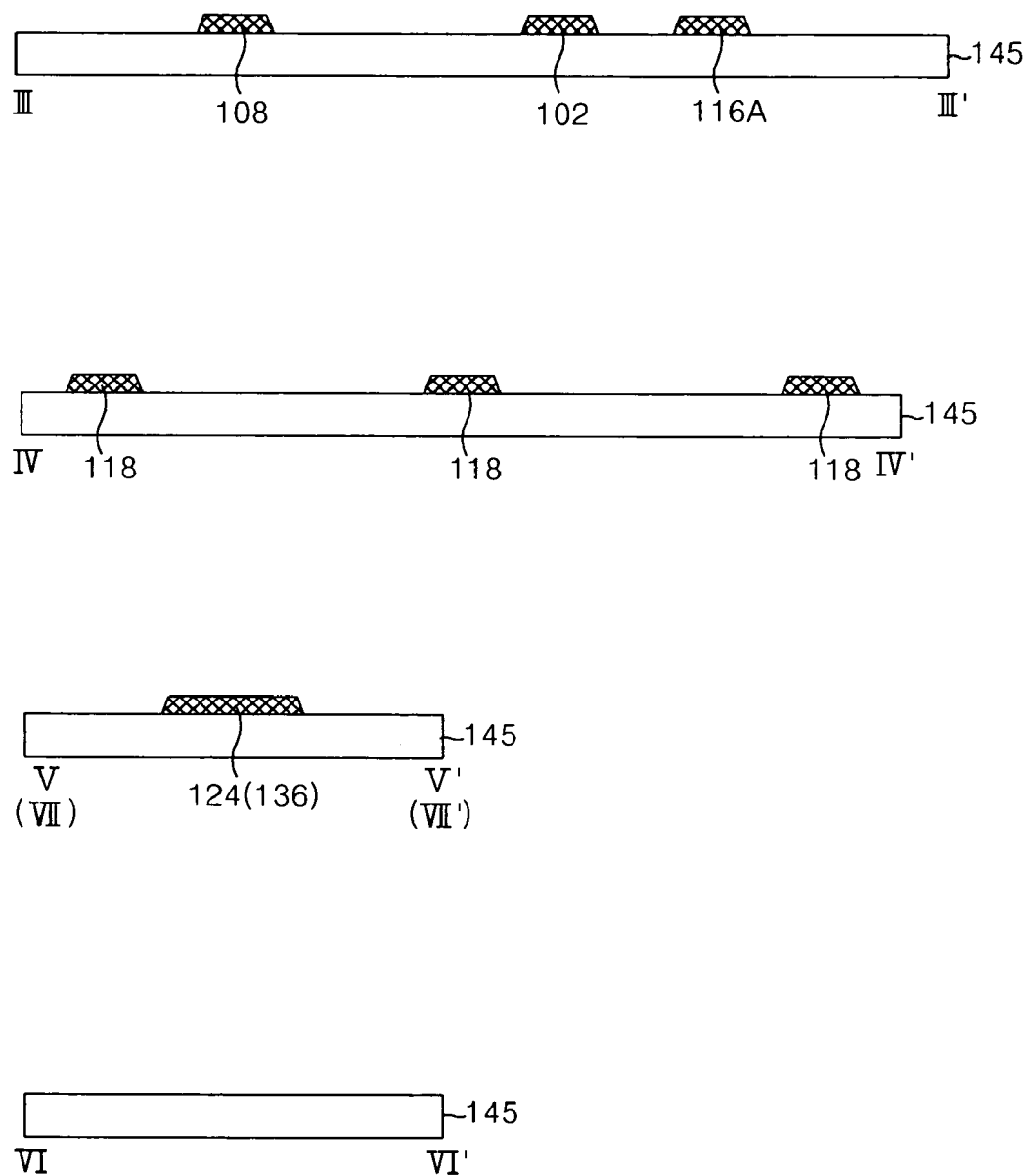

A method of fabricating the thin film transistor substrate according to an embodiment of the present invention having such an advantage will be described in detail below. FIG. 6A and FIG. 6B are a plan view and a cross-sectional view for explaining a first mask process in a method of fabricating a thin film transistor substrate of a horizontal electric field type LCD device according to an embodiment of the present invention.

As shown in FIG. 6A and FIG. 6B, a first conductive pattern group including the gate line 102, the gate electrode 108, the lower gate pad electrode 124, the common line 116, the common electrode 118 and the lower common pad electrode 136 are disposed on the lower substrate 145 by the first mask process. More specifically, a first conductive layer is formed on the upper substrate 145 by a deposition technique such as sputtering. Then, the first conductive layer is patterned by photolithography and an etching process using a first mask to form a first conductive pattern group. The first conductive layer is formed of Cr, MoW, Cr/Al, Cu, Al(Nd), Mo/Al, Mo/Al(Nd) or Cr/Al(Nd), or other suitable material.

Figure 7A:
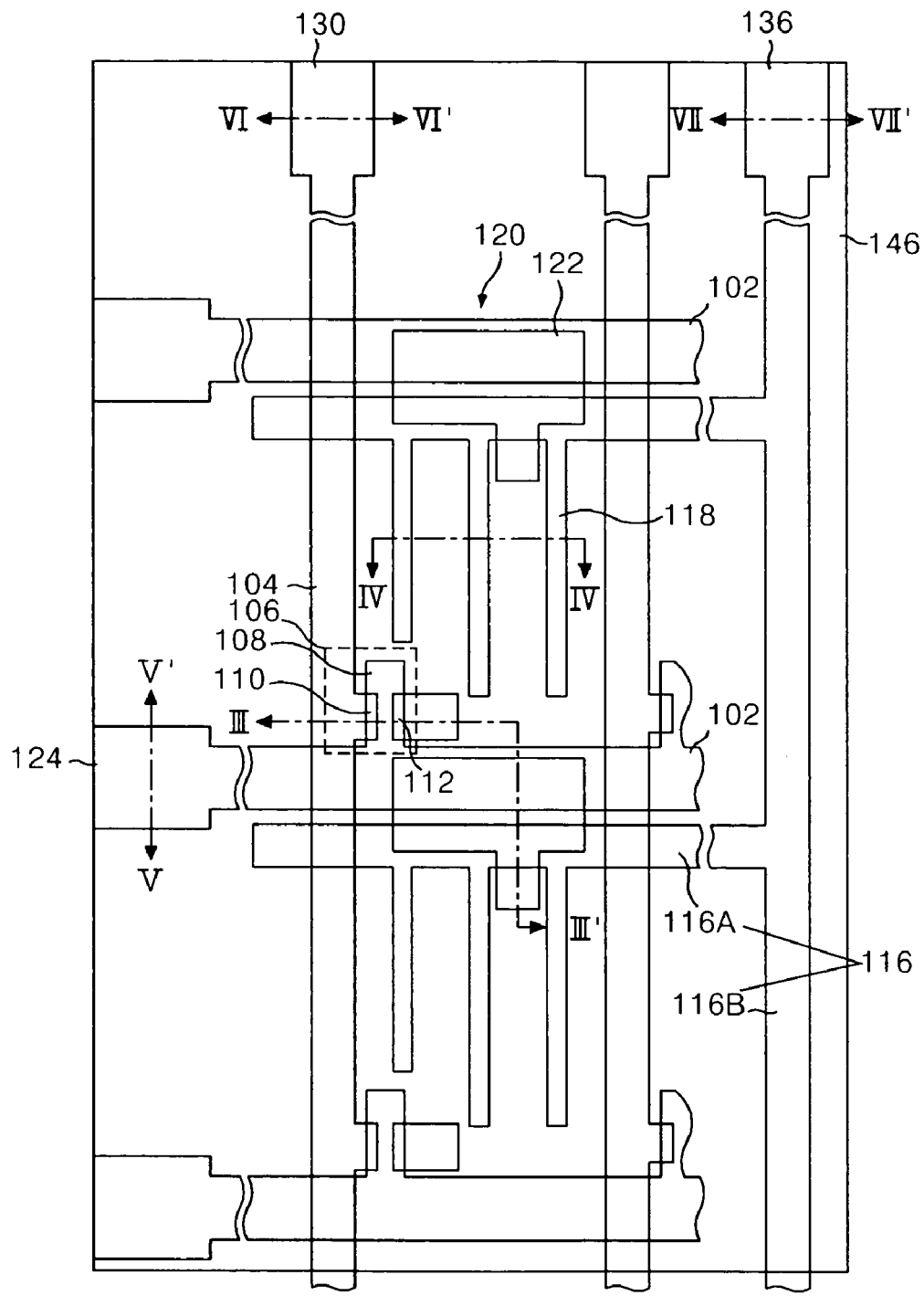
FIG. 7A and FIG. 7B are a plan view and a cross-sectional view for explaining a second mask process in a method of fabricating the thin film transistor substrate according to an embodiment of the present invention.
Figure 7B:
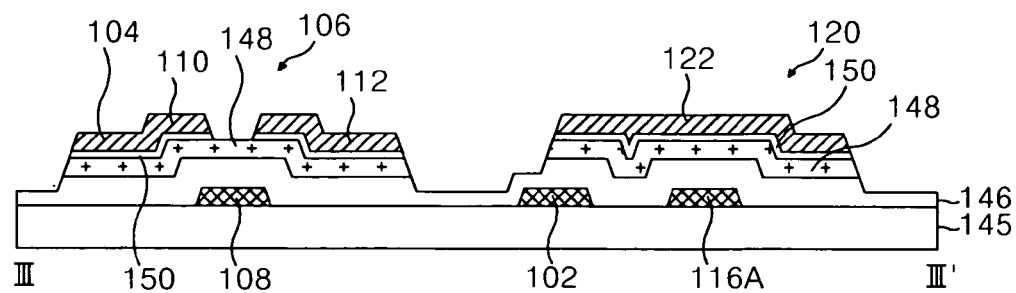
Figure 7B:
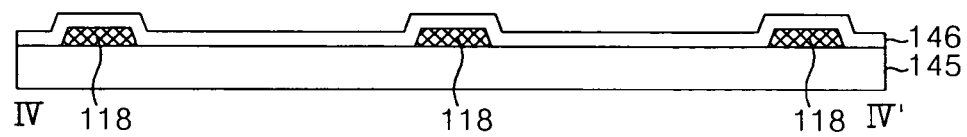
Figure 7B:
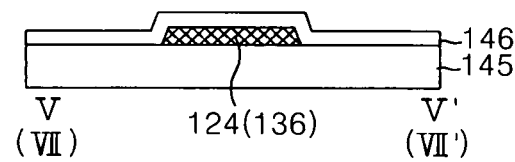
Figure 7B:
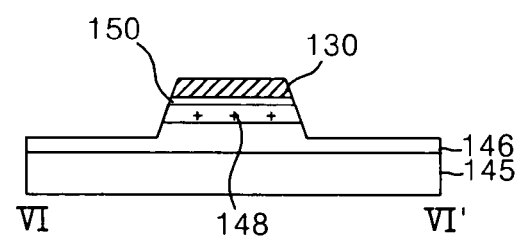

FIG. 7A and FIG. 7B are a plan view and a cross-sectional view for explaining a second mask process in a method of fabricating a thin film transistor substrate of a horizontal electric field type LCD device according to an embodiment of the present invention. FIG. 8A to FIG. 8E are cross-sectional views for specifically explaining the second mask process.

Firstly, the gate insulating film 146 is formed on the lower substrate 145 which is already provided with the first conductive pattern group by a deposition techniques such as plasma enhanced chemical vapor deposition (PECVD), sputtering and other suitable technique. The gate insulating film 146 is formed of an inorganic insulating material such as silicon nitride ($SiN_x$) or silicon oxide ($SiO_x$).

Figure 8A:
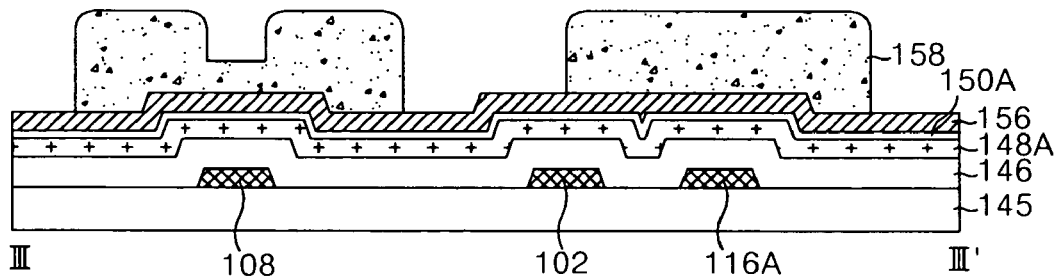
FIG. 8A to FIG. 8E are cross-sectional views for specifically explaining the second mask process in a method of fabricating the thin film transistor substrate according to an embodiment of the present invention.
Figure 8A:
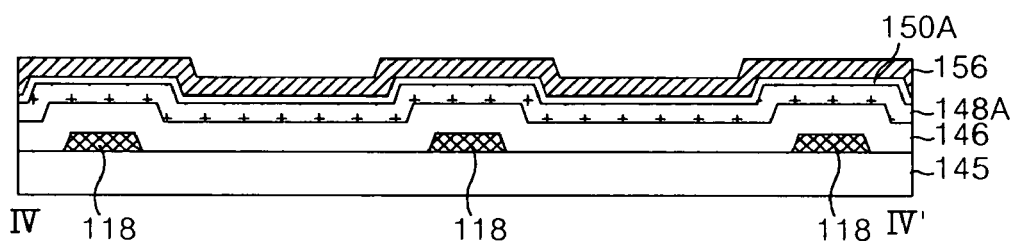
Figure 8A:
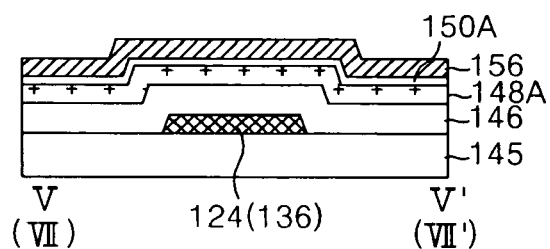
Figure 8A:
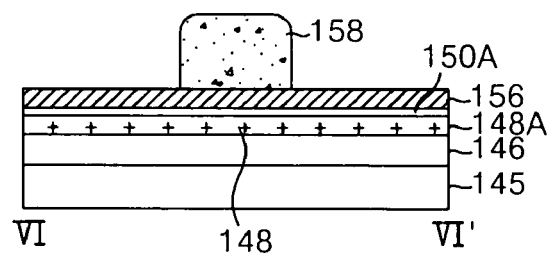

As shown in FIG. 7A and FIG. 7B, a semiconductor pattern including the active layer 148 and the ohmic contact layer 150 are disposed on the gate insulating film 146; thereafter a second conductive pattern group (i.e., source/drain pattern group) including the data line 104, the source electrode 110, the drain electrode 112, the lower data pad electrode 130, and the upper storage electrode 122 are provided by the second mask process. More specifically, as shown in FIG. 8A, an amorphous silicon layer 148A, an $n^+$ amorphous silicon layer 150A and the second conductive layer 156 are sequentially formed on the gate insulating film 146 by deposition techniques such as plasma enhanced chemical vapor deposition (PECVD) and sputtering, or other suitable technique. The second conductive layer 156 is formed of Cr, MoW, Cr/Al, Cu, Al(Nd), Mo/Al, Mo/Al(Nd) or Cr/Al(Nd), or other suitable material.

Next, as shown in FIG. 8A a photo-resist film is entirely coated on the second conductive layer 156 and then a photo-resist pattern 158 is formed by photolithography using a second mask. The photo-resist pattern 158 uses a partial-exposure mask included in the second mask to form a step coverage over the second conductive layer 156. In this case, a partial-exposure mask having a diffractive exposing part (or a semi-transmitting or transflective part) is provided at a portion where a channel of the thin film transistor is to be formed. Thus, the photo-resist pattern 158 corresponding to the diffractive exposing part (or the semi-transmitting part) of the second mask has a lower height than the photo-resist pattern 158 corresponding to a transmitting part (or a shielding part) of the second mask. In other words, the photo-resist pattern 158 at the channel portion has a lower height than the photo-resist pattern 158 at other source/drain metal pattern portion.

Figure 8B:
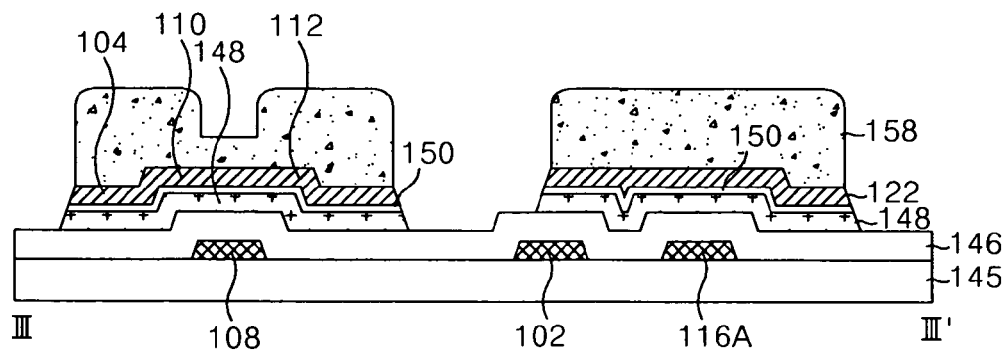
Figure 8B:
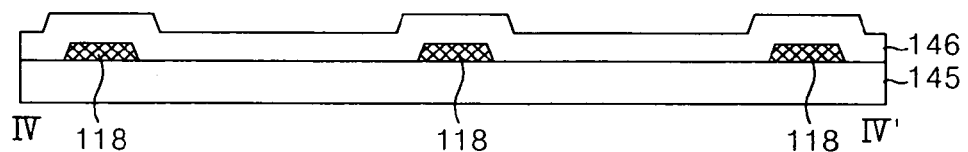
Figure 8B:
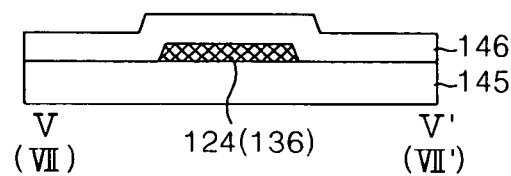
Figure 8B:
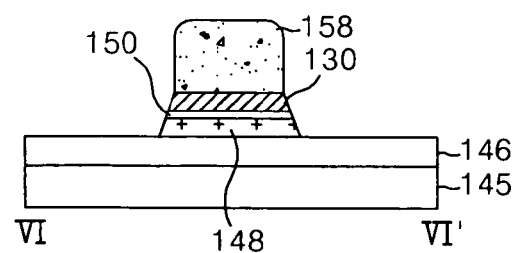

Subsequently, as shown in FIG. 8B, the second conductive layer 156 is patterned by a wet etching process using the photo-resist pattern 158 as a mask to provide the second conductive pattern group including the data line 104, the source electrode 110 of the thin film transistor, the drain electrode 112 integrated with the source electrode 110, the lower data pad electrode 130 and the upper storage electrode 122. The portion of upper storage electrode 122 overlaps a portion of the gate line 102 forming the first lower storage electrode and the internal common line 116A forming the second lower storage electrode. The $n^+$ amorphous silicon layer 150A and the amorphous silicon layer 148A are patterned simultaneously by a dry etching process using the same photo-resist pattern 158 as a mask to provide the ohmic contact layer 150 and the active layer 148 over the second conductive pattern group.

Figure 8C:
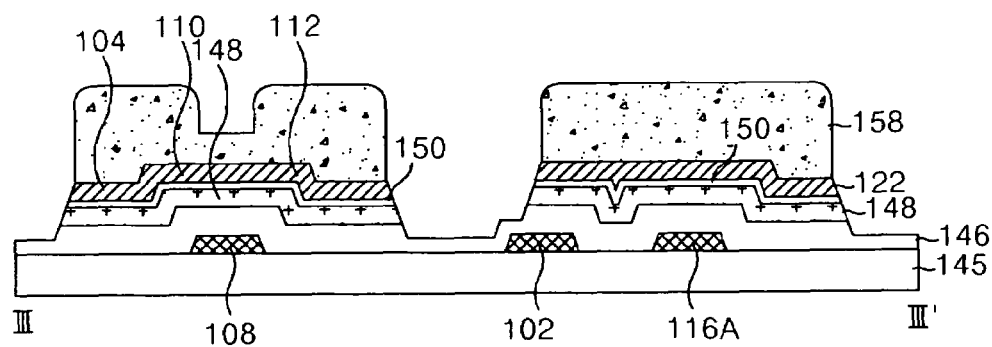
Figure 8C:
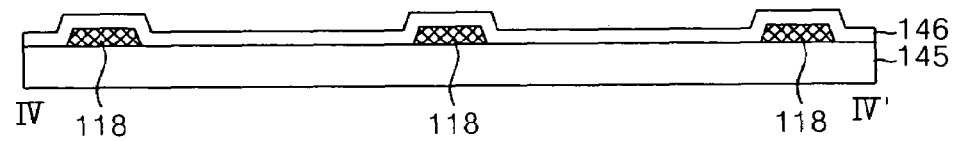
Figure 8C:
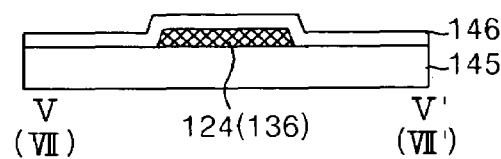
Figure 8C:
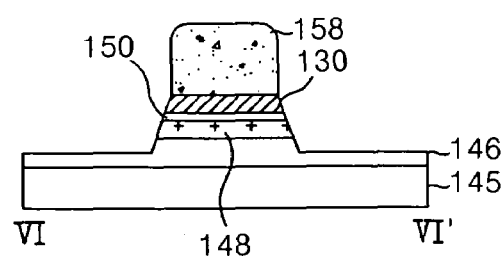

Furthermore, as shown in FIG. 8C, a dry etching process using the photo-resist pattern 158 as a mask is implemented to reduce a thickness of the gate insulating film 146. The thickness of the gate insulating film 146 is reduced at the portion where the photo-resist pattern 158 is absent. Thus, the gate insulating film 146 have a relatively large thickness at the second conductive pattern group portion to prevent an insulation breakage (i.e., the intersection portion of the thin film transistor 106, the data line 104 and the gate line 102, etc.) while having a relatively small thickness at the pixel area. Accordingly, the pixel electrode disposed in the pixel area are formed to pass through the gate insulating film 146, thus leaving a low step coverage.

Figure 8D:
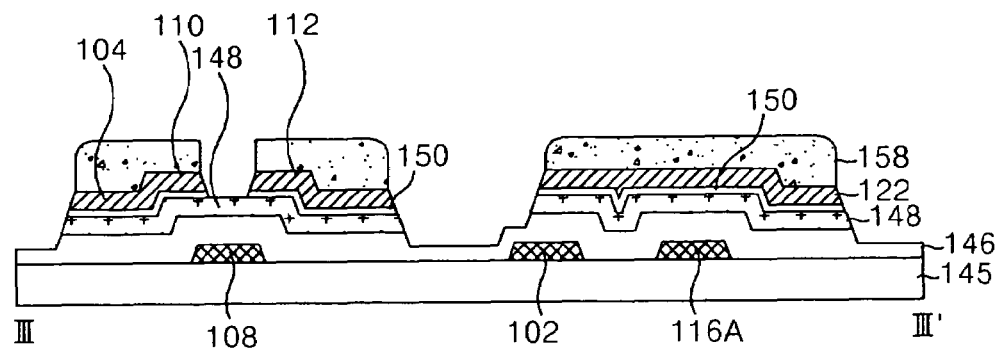
Figure 8D:
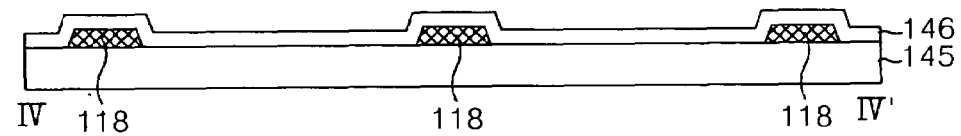
Figure 8D:
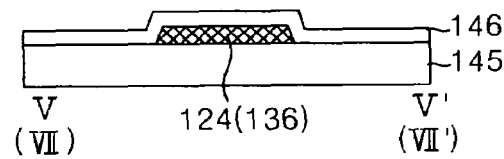
Figure 8D:
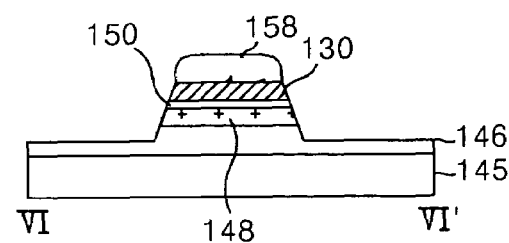
Figure 8E:
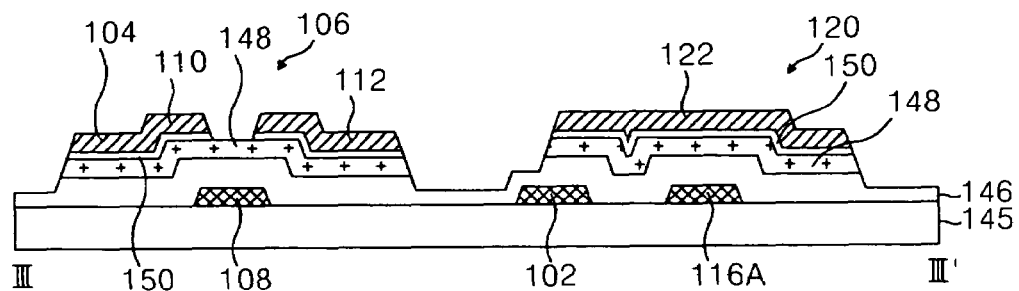
Figure 8E:
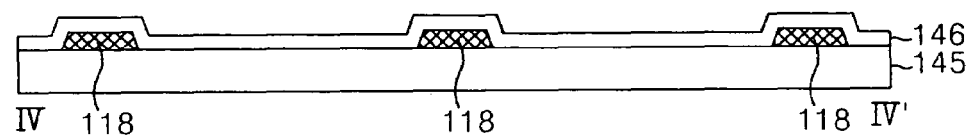
Figure 8E:
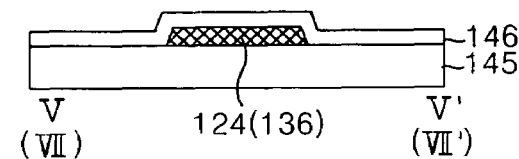
Figure 8E:
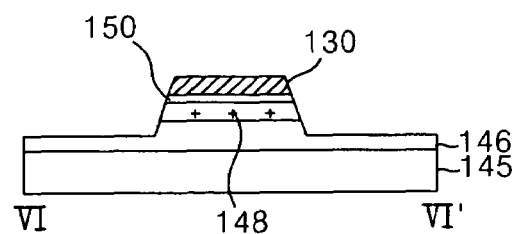

Then, as shown in FIG. 8D, the photo-resist pattern 158 at the channel portion having a relatively low height is removed by an ashing process using oxygen (O₂) plasma. The photo-resist pattern 158 having a higher height disposed at the other second conductive pattern group is preserved. As shown in FIG. 8D, the second conductive layer and the ohmic contact layer 150 are etched by a dry etching process from a portion at which the channel is formed using the remaining photo-resist pattern 158, thereby disconnecting the source electrode 110 from the drain electrode 112 and exposing the active layer 148. Thus, a channel made from the active layer 148 is defined between the source electrode 110 and the drain electrode 114. Furthermore, as shown in FIG. 8E, the remaining portion of the photo-resist pattern 158 on the second conductive pattern group portion is entirely removed by a stripping process.

Figure 9A:
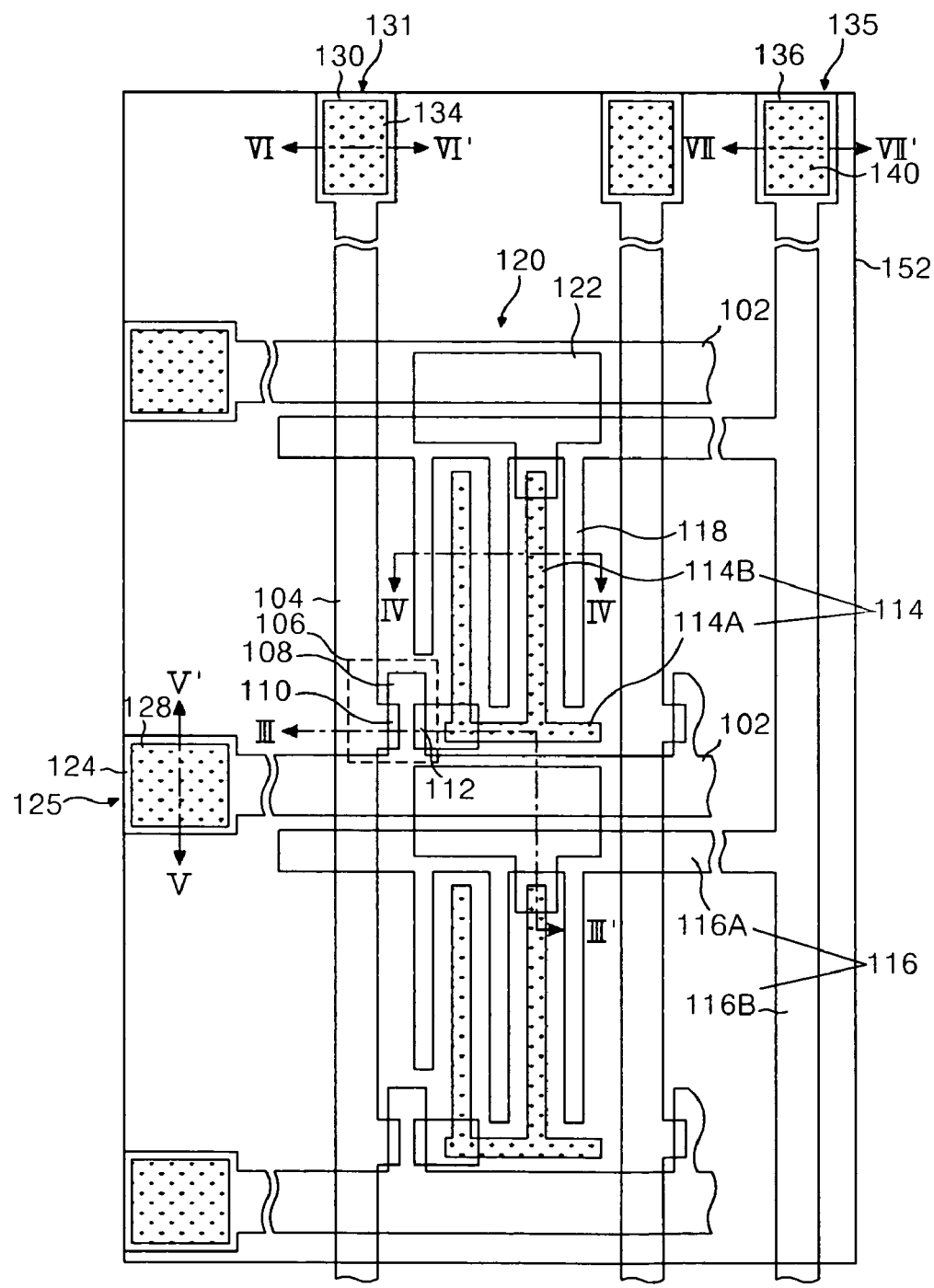
FIG. 9A and FIG. 9B are a plan view and a cross-sectional view for explaining a third mask process in a method of fabricating the thin film transistor substrate according to an embodiment of the present invention.
Figure 9B:
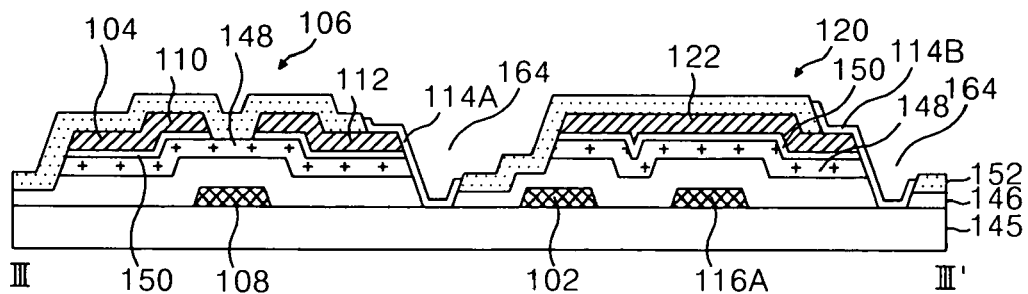
Figure 9B:
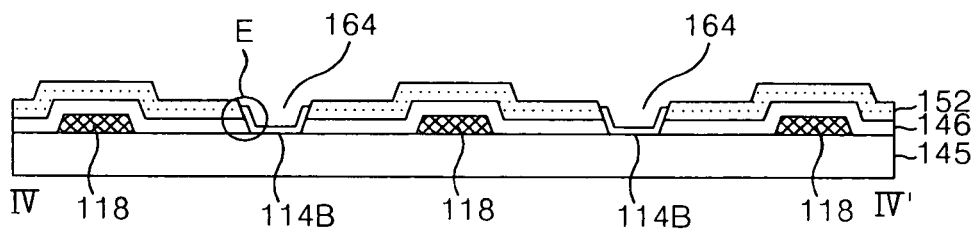
Figure 9B:
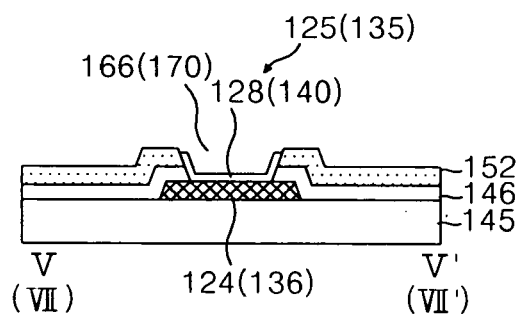
Figure 9B:
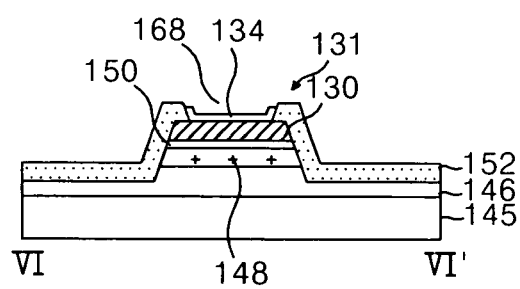

FIG. 9A and FIG. 9B are a plan view and a cross-sectional view for explaining a third mask process in a method of fabricating a thin film transistor substrate of a horizontal electric field type LCD device according to an embodiment of the present invention, respectively, and FIG. 10A to FIG. 10D are cross-sectional views for specifically explaining the second mask process.

Figure 10A:
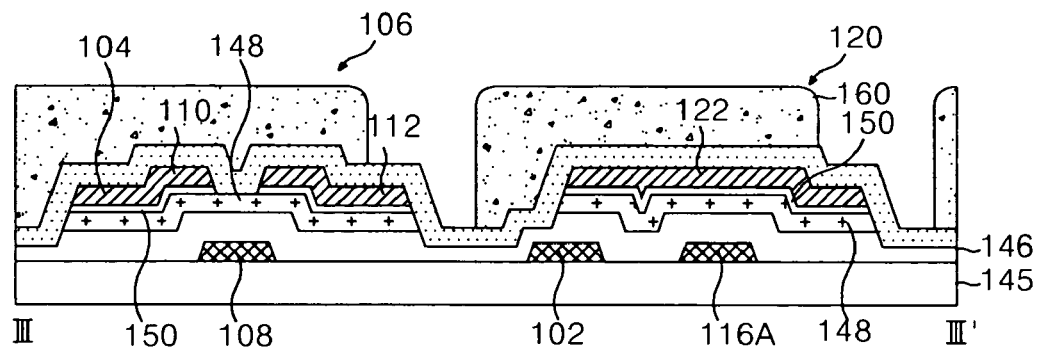
FIG. 10A to FIG. 10D are cross-sectional views for specifically explaining the third mask process in a method of fabricating the thin film transistor substrate according to an embodiment of the present invention.
Figure 10A:
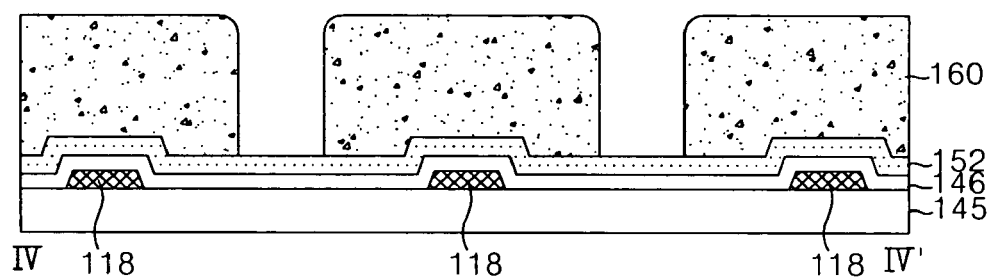
Figure 10A:
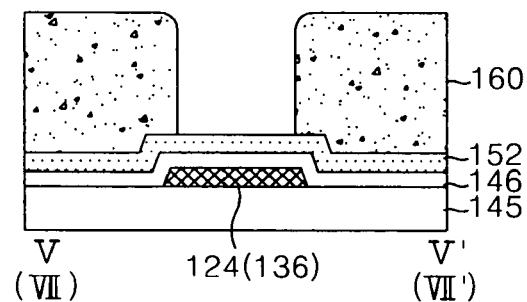
Figure 10A:
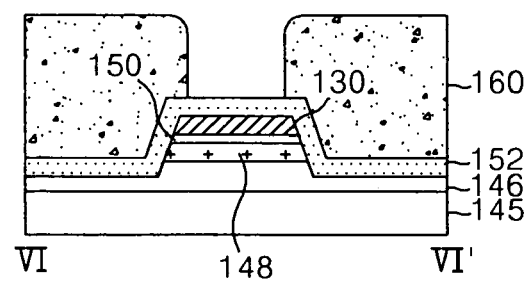

As shown in FIG. 9A and FIG. 9B, the protective film 152 and the gate insulating film 146 are patterned and a third conductive pattern group including the pixel electrode 114, the upper gate pad electrode 128, the upper data pad electrode 134 and the upper common pad electrode 140 is formed by the third mask process. The third conductive pattern group interfaces with the patterned protective film 152 without any overlapped portions. More specifically, as shown in FIG. 10A, the protective film 152 is entirely formed on the gate insulating film 146 which is provided with the second conductive pattern group. The protective film 152 is formed of an inorganic insulating material or an organic insulating material similar to that of the gate insulating film 146. Thereafter, a photo-resist pattern 160 is formed by photolithography using a third mask at a portion where the protective film 152 needs to be preserved.

Figure 10B:
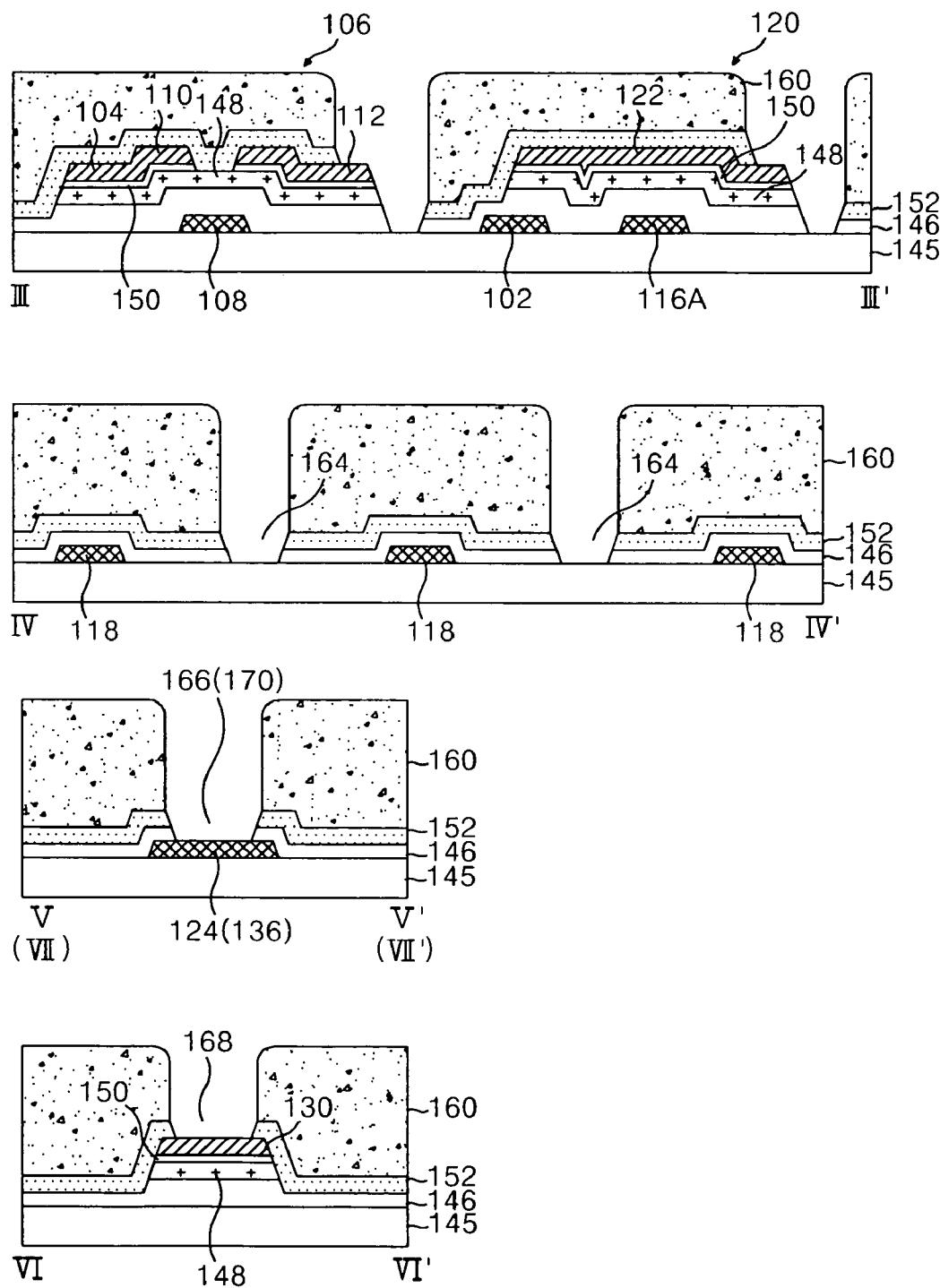

Next, as shown in FIG. 10B, the protective film 152 and the gate insulating film 146 are patterned by a dry etching process using the photo-resist pattern 160. A plurality of pixel holes 164 and the first to third contact holes 166, 170 and 168 defined by either passing through the protective film 152 above, or passing through the protective film 152 and the gate insulating film 146 are provided. More specifically, the pixel hole 164 is formed at a portion where the pixel electrode is to be formed. The protective film 152 and the gate insulating film 146 having a relatively small thickness are etched exposing a portion of the drain electrode 122 and the upper storage electrode 122 in at least one pixel hole. Furthermore, the first and second contact holes 166 and 170 defined by passing through the protective film 152 and the gate insulating film 146 having a relatively small thickness expose the lower gate pad electrode 124 and the lower common pad electrode 136, respectively. The third contact hole 168 defined by passing through the protective film 152 exposes the lower data pad electrode.

Figure 10C:
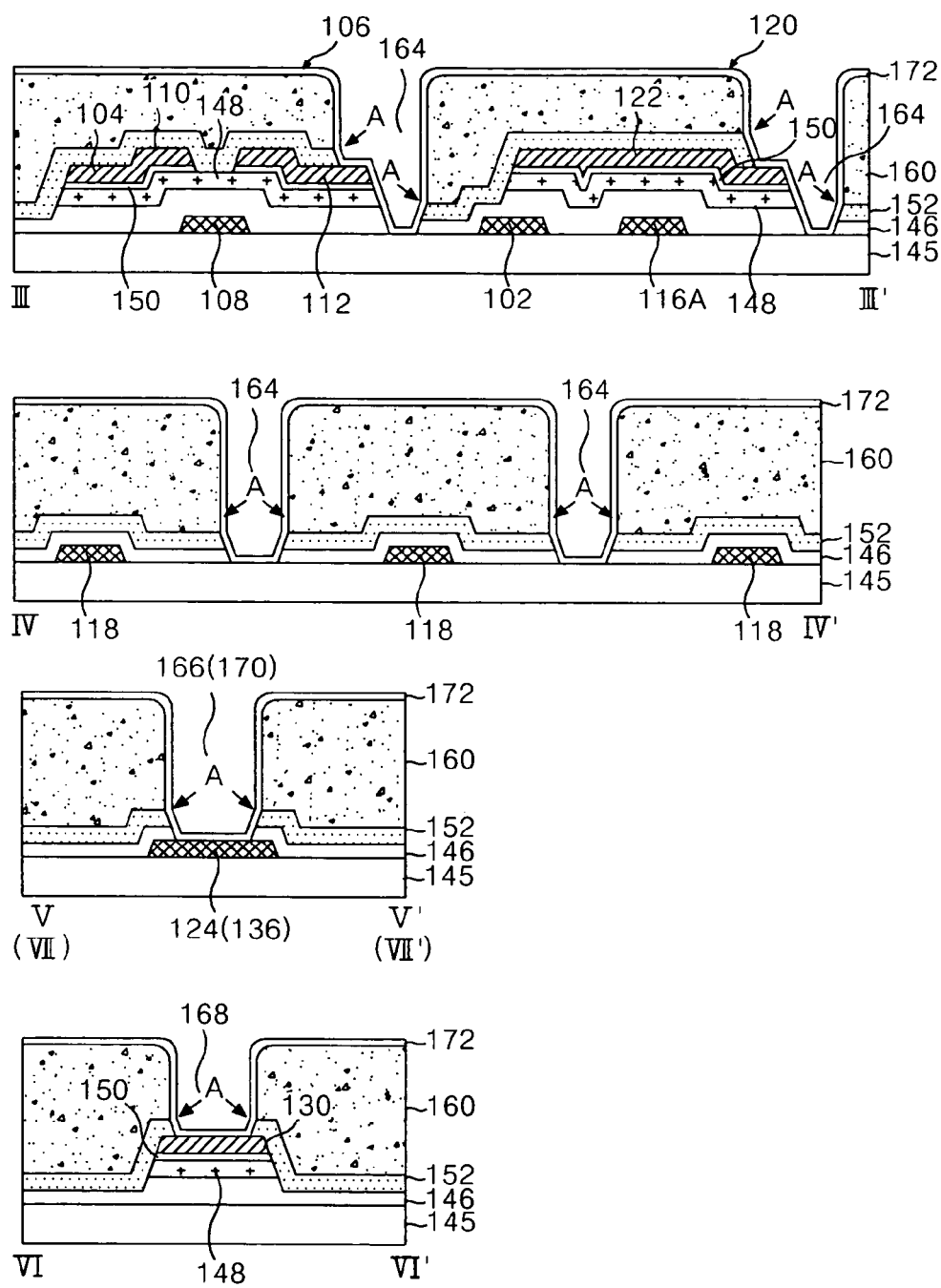

Subsequently, as shown in FIG. 10C, a third conductive layer 172 is entirely formed on the thin film transistor substrate provided with the photo-resist pattern 160, where the photo-resist pattern 160 is provided by a deposition technique such as sputtering and the like. The third conductive layer 172 is formed of a transparent conductive film such as indium-tin-oxide (ITO), tin-oxide (TO) or indium-zinc-oxide (IZO), or other suitable material. Alternatively, the third conductive film 172 is formed of a metal having a high corrosion-resisting and a high mechanical strength such as titanium (Ti) or tungsten (W), or other suitable material.

Figure 10D:
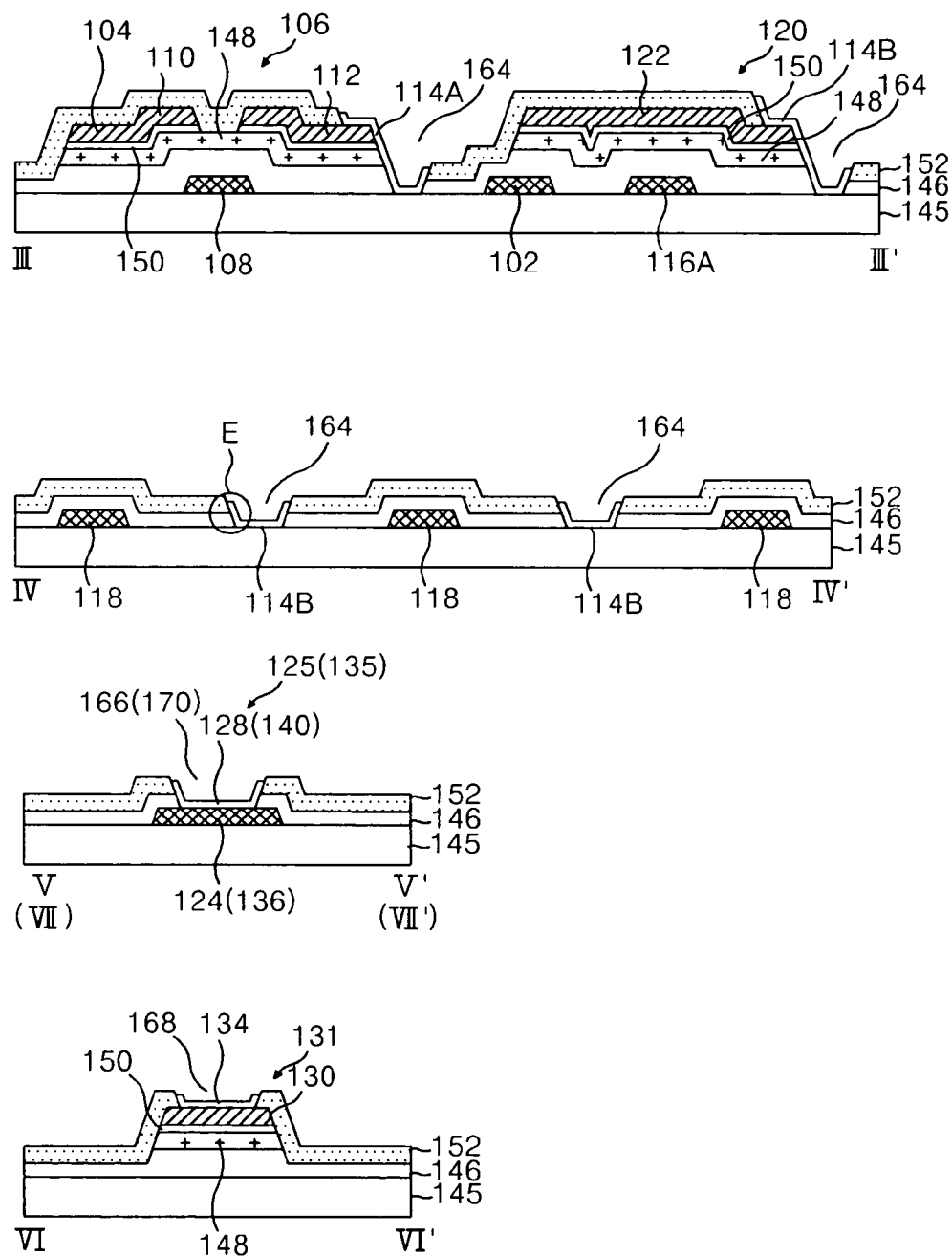

The photo-resist pattern 160 and the third conductive layer 172 thereon are simultaneously removed by a lift-off process to pattern the third conductive layer 172. As shown in FIG. 10D, the pixel electrode 114, the upper gate pad electrode 128, the upper common pad electrode 140, and the tipper data pad electrode 134 are disposed within the pixel hole 164 and the first to third contact holes 166, 170 and 168, respectively.

In this case, the pixel hole 164 and the first to third contact holes 162, 166 and 170 are formed at a portion where the photo-resist pattern 160 does not exist. Thus, the pixel hole 164 and the first to third contact holes 162, 166 and 170 can be used as a stripper penetration path allowing a greater amount of stripper A of FIG. 10C to be infiltrated into the interface part between the photo-resist pattern 160 and the protective film 152. As a result, the photo-resist pattern 160 and the third conductive layer 172 are easily separated from the protective film 152 because of the stripper A. This is caused by a fact that the edge of the photo-resist pattern 160 has a more protruded shape (not shown) than the edge of the protective film 152 at a portion where the pixel hole 164 and the first to third contact holes 162, 166 and 170 are provided due to an over-etching of the protective film 152. Furthermore, this is because the third conductive layer 172 is deposited linearly between the edge of the photo-resist pattern 160 and the edge of the opening of the protective film, or relatively thinly deposited by the protruded edge of the photo-resist pattern 160 to thereby easily infiltrate the stripper A.

As mentioned above, an unnecessary portion of the third conductive layer 172 and the photo-resist pattern 160 are removed by the lift-off process, so that the third conductive pattern group interfaces with the protective film 152. More specifically, the pixel electrode 114 is disposed within the pixel hole 164 to be connected to a portion of the drain electrode 112 and portion of the upper storage electrode 122. The upper gate pad electrode 128, the upper common pad electrode 140 and the upper data pad electrode 134 are disposed within the corresponding contact holes 166, 170 and 168 to be connected to the lower gate pad electrode 124, the lower common pad electrode 136 and the lower data pad electrode 130, respectively.

Particularly, the pixel electrode 114 is provided within the pixel hole 164 defined by passing through the protective film 152 and the gate insulating film 146 having a relatively small thickness, so that the edge E of FIG. 10E have a low step coverage. Thus, it is possible to prevent a light-leakage error that may be caused by a high step coverage of the pixel electrode 114. Furthermore, if titanium (Ti) is used as the third conductive layer 172, it may be possible to prevent a light leakage error through the pixel electrode 114 and to prevent an electro-chemical corrosion, a tearing, or other defect of the pad portion.

As described above, according to an embodiment of the present invention, the lift-off process is employed to reduce the total number of mask processes. Accordingly, the thin film transistor substrate is fabricated by the three-round mask process simplifying the mask process, reducing the manufacturing cost, and improving the production yield. Furthermore, the pixel hole and the first to third contact holes defined by passing through the protective film are used as a stripper infiltration path, so that a lift-off ability is enhanced when removing the photo-resist pattern covered with the third conductive layer. Moreover, the pixel electrode is provided within the pixel hole, so that the edge of the pixel electrode have a low step coverage. Accordingly, prevention of a light-leakage error is achieved.

It will be apparent to those skilled in the art that various modifications and variations can be made in the thin film transistor substrate of the horizontal electronic field type LCD device and fabricating method thereof of the present invention without departing from the spirit or scope of the invention. Thus, it is intended that the present invention covers the modifications and variations of this invention provided they come within the scope of the appended claims and their equivalents.

What is claimed is:

1. A thin film transistor substrate structure using a horizontal electric field liquid crystal display device, comprising:
    a gate line and a common line disposed on a substrate and arranged parallel with each other, wherein the gate line and the common line are formed from a first conductive layer;
    a data line on the substrate and intersecting the gate line and the common line, the data line insulated from the gate line and the common line by a gate insulating film therebetween, a pixel area being defined by the intersection of the data line with the gate line, wherein the data line is formed from a second conductive layer; a thin film transistor at the intersection of the data line and the gate line, and connected to the gate line and the data line;
    a common electrode having a portion extended from the common line into the pixel area and formed from the first conductive layer;
    a gate insulating film disposed between the first conductive layer and the second conductive layer, the gate insulating film at the pixel having a non-zero thickness thinner than at an area overlapping the second conductive layer;
    a protective film over the gate line, the common line, the data line, the common electrode, and the thin film transistor; and
    a pixel hole defined through the protective film and the gate insulating film and formed parallel with the common electrode;
    a pixel electrode having a portion extended into the pixel area and connected to the thin film transistor, wherein the pixel electrode is formed from a third conductive layer and forming a horizontal electric field with the common electrode, wherein the pixel electrode is disposed within the pixel hole.

2. The thin film transistor substrate structure according to claim 1, further comprising:
    a gate pad, wherein the gate pad includes a lower gate pad electrode extended from the gate line,
    a first contact hole exposed a portion of the lower gate pad electrode, and
    an upper gate pad electrode formed of the third conductive layer within the first contact hole such that the upper gate pad electrode is absent from the upper surface of the protective film.

3. The thin film transistor substrate structure according to claim 2, further comprising:
    a common pad, wherein the common pad includes a lower common pad electrode extended from the common line,
    a second contact hole exposed a portion of the lower common pad electrode, and
    an upper common pad electrode formed from the third conductive layer within the second contact hole such that the upper common electrode is absent from the upper surface of the protective film.

4. The thin film transistor substrate structure according to claim 3, further comprising:
    a data pad, wherein the data pad includes a lower data pad electrode extended from the data line,
    a third contact hole defined through the protective film to expose a portion of the lower data pad electrode, and
    an upper data pad electrode formed from the third conductive layer within the third contact hole such that the upper data pad electrode is absent from the upper surface of the protective film.

5. The thin film transistor substrate structure according to claim 4, wherein the pixel electrode, the upper gate pad electrode, the upper common pad electrode and the upper data pad electrode interface with the protective film within the respective one of contact holes.

6. The thin film transistor substrate structure according to claim 1, further comprising:
    a storage capacitor, the storage capacitor includes a first lower storage electrode connected to the gate line,
    a second lower storage electrode connected to the common line and disposed adjacent to the gate line, and
    an upper storage electrode connected to the pixel electrode, wherein the upper storage electrode is insulated from the first and second lower storage electrodes by having the gate insulating film therebetween.

7. The thin film transistor substrate structure according to claim 6, wherein an active layer and an ohmic contact layer overlaps the data line and the upper storage electrode and a lower data pad electrode.

8. The thin film transistor substrate structure according to claim 6, wherein the gate insulating film has a larger thickness overlapping the thin film transistor, the data line, a lower data pad electrode and the upper storage electrode.

9. A method of fabricating a thin film transistor substrate structure using a horizontal electric field liquid crystal display device, comprising the steps of:
    forming a gate line, a gate electrode is connected to the gate line, a common line being
    parallel to the gate line, a common electrode extended from the common line into a pixel area from a first conductive layer on a substrate;
    providing a gate insulating film on the substrate disposed with the gate line, the common line, and the common electrode;
    forming a semiconductor pattern including an active layer and an ohmic contact layer on the gate insulating film;
    forming a data line, a source electrode, a drain electrode from a second conductive layer on the semiconductor pattern, wherein the data line crosses the gate line and the common line, the source electrode is connected to the data line, and the drain electrode is formed opposite to the source electrode;
    reducing a thickness of the gate insulating film to a non-zero thickness at portions where the second conductive layer is absent;
    providing a protective film on the on the substrate disposed with the semiconductor pattern and the second conductive layer; and patterning the protective film and the gate insulating film disposed on the substrate to provide a pixel hole formed parallel to the common electrode, wherein portion of the drain electrode is exposed within the pixel hole;

forming a pixel electrode connected to the drain electrode from a third conductive layer, wherein the pixel electrode is disposed within the hole.

10. The method according to claim 9, wherein the step of reducing a thickness of the gate insulating film includes:
etching out a portion of the gate insulating film where a photo-resist pattern is absent on the second conductive layer.

11. The method according to claim 9, wherein the steps of forming the semiconductor pattern and forming the data line, the source electrode, the drain electrode include:
forming the active layer, the ohmic contact layer and the second conductive layer on the gate insulating film;
forming a photo-resist pattern created by a partial-transmitting mask on the second conductive layer;
patterning the second conductive layer, the active layer, and the ohmic contact layer using the photo-resist pattern;
ashing the photo-resist pattern to remove the photo-resist pattern having a relatively thin thickness and portions of the second conductive layer, thereby disconnecting the source electrode from the drain electrode; and
removing the remaining photo-resist pattern left on the semiconductor pattern.

12. The method according to claim 9, wherein the step of patterning the protective film includes:
forming a photo-resist pattern on the protective film using a mask; and
etching the protective film and the gate insulating film using the photo-resist pattern.

13. The method according to claim 12, wherein the step of forming the pixel electrode includes:
forming the third conductive layer on the photo-resist pattern left on the patterned protective film; and
removing the photo-resist pattern and portions of the third conductive layer by a lift-off process.

14. The method according to claim 9, further comprising the steps of:
forming a lower gate pad electrode extended form the gate line from the first conductive layer;
forming a first contact hole defined through the protective film and the gate insulating film to expose a portion of the lower gate pad electrode; and
forming an upper gate pad electrode from the third conductive layer disposed within the first contact hole, wherein the upper gate pad electrode is connected to the lower gate pad electrode such that the upper gate electrode is absent from the entire upper surface of the protective film.

15. The method according to claim 9, further comprising the steps of:
forming a lower common pad electrode extended form the common line form the conductive layer;
forming a second contact hole defined through the protective film and the gate insulating film to expose a portion of the lower common pad electrode; and
forming an upper common pad electrode from the third conductive layer disposed within the second contact hole, where in the upper common pad electrode is connected to the lower common pad electrode such that the upper common electrode is absent from the entire upper surface of the protective film.

16. The method according to claim 9, further comprising the steps of:
forming a lower data pad electrode extended from the data line form the second conductive layer;
forming a third contact hole defined through the protective film to expose a portion of lower data pad electrode; and
forming an upper data pad electrode from the third conductive layer disposed within the third contact hole, wherein the upper data pad electrode is connected to the lower data pad electrode such that the upper data pad electrode is absent from the entire upper surface of the protective film.

17. The method according to claim 16, wherein the common electrode, the pixel electrode, the upper gate pad electrode, the upper common pad electrode and the upper data pad electrode interface with the protective film within the respective one of contact holes.

18. The method according to claim 16, wherein any one of a first, a second, and the third contact holes is used as a stripper penetration path to remove the photo-resist pattern upon patterning of the protective film.

19. The method according to claim 9, further comprising the step of:
forming an upper storage electrode overlapping a portion of the gate line and a portion of the common line, wherein the upper storage electrode is connected to the pixel electrode and insulated from the portion of the gate line and the portion of the common line by having the gate insulating film and the semiconductor pattern therebetween.

20. The method according to claim 9, wherein the third conductive layer material includes at least one of a transparent conductive material, titanium and tungsten.

21. A method of fabricating a thin film transistor substrate structure using a horizontal electric field liquid crystal display device, the method comprising:
a first mask process of forming a gate line, a gate electrode connected to the gate line, a common line being parallel to the gate line, a common electrode extended from the common line into a pixel area from a first conductive layer on a substrate;
a second mask process including providing a gate insulating film on the substrate disposed with the gate line, the gate electrode, the common line, and the common electrode, forming a semiconductor pattern including an active layer and an ohmic contact layer on the gate insulating film, forming a data line, a source electrode, a drain electrode from a second conductive layer on the semiconductor pattern, reducing a thickness of the gate insulating film to a non-zero thickness at portions where the second conductive layer is absent, wherein the data line crosses the gate line and the common line, the source electrode is connected to the data line, and the drain electrode is formed opposite to the source electrode;
a third mask process including providing a protective film on the substrate deposed with the second conductive layer and the semiconductor pattern and patterning the protective film and the gate insulating film to provide a pixel hole formed parallel to the common electrode and forming a pixel electrode within the pixel hole from a third conductive layer, wherein the pixel electrode is connected to the portion of the drain exposed through the pixel hole.

22. The method according to claim 21, wherein the second mask process includes the steps of:

forming a semiconductor layer and the second conductive layer on the gate insulating film;

forming a photo-resist pattern created by a partial-transmitting mask on the second conductive layer;

patterning portions of the second conductive layer and the semiconductor layer where the photo-resist pattern is absent;

etching the gate insulating film through the photo-resist pattern to reduce a thickness thereof;

ashing the photo-resist pattern to remove a relatively thin photo-resist pattern and portions of the second conductive layer, thereby disconnecting the source electrode from the drain electrode; and removing the remaining photo-resist pattern left on the semiconductor pattern.

23. The method according to claim 21, wherein the third mask process includes the steps of:

providing a protective film;

forming a photo-resist pattern on the protective film using a mask;

etching the protective film and portion of a relatively thin gate insulating film where the photo-resist pattern is absent;

forming the third conductive layer on the photo-resist pattern left on the etched protective film; and removing the photo-resist pattern and portions of the third conductive layer by a lift-off process.

24. The method according to claim 23, wherein the first mask process further includes the step of forming a lower gate pad electrode extended from the gate line, and the third mask process further includes the step of forming a first contact hole defined through the protective film and the gate insulating film to expose a portion of the lower gate pad electrode, and forming an upper gate pad electrode from the third conductive layer disposed within the first contact hole, wherein the upper gate pad electrode is connected to the lower gate pad electrode such that the upper gate electrode is absent from the entire upper surface of the protective film.

25. The method according to claim 24, wherein the first mask process further includes the step of forming a lower common pad electrode extended from the common line, and the third mask process further includes the step of forming a second contact hole defined through the protective film and the gate insulating film to expose a portion of the lower common pad electrode, and forming an upper common pad electrode from the third conductive layer disposed within the second contact hole, wherein the upper common pad electrode is connected to the lower common pad electrode such that the upper common electrode is absent from the entire upper surface of the protective film.

26. The method according to claim 25, wherein the second mask process further includes the step of forming a lower data pad electrode extended from the data line and overlapping the semiconductor pattern, and the third mask process further includes the step of forming a third contact hole defined through the protective film to expose a portion of the lower data pad electrode, and forming an upper data pad electrode from the third conductive layer disposed within the third contact hole, wherein the upper data pad electrode is connected to the lower data pad electrode such that the upper data pad electrode is absent from the entire upper surface of the protective film.

27. The method according to claim 26, wherein the common electrode, the pixel electrode, the upper gate pad electrode, the upper common pad electrode and the upper data pad electrode interface with the protective film within the respective one of contact holes.

28. The method according to claim 26, wherein any one of the first, second, and third contact holes is used as a stripper penetration path to remove the photo-resist pattern upon patterning of the protective film.

29. The method according to claim 21, wherein the second mask process further includes the step of forming an upper storage electrode overlapping a portion of the gate line and a portion of the common line, wherein the upper storage electrode is connected to the pixel electrode and insulated from the portion of the gate line and the potion of the common line by having the gate insulating film and the semiconductor pattern therebetween.

30. The method according to claim 21, wherein the third conductive layer material includes at least one of a transparent conductive material, titanium and tungsten.

* * * * *